US012272479B2

(12) United States Patent
Lacey et al.

(10) Patent No.: US 12,272,479 B2
(45) Date of Patent: Apr. 8, 2025

(54) ISOLATING TRANSFORMER

(71) Applicant: UWB X LIMITED, Warrington (GB)

(72) Inventors: Glenn Richard Lacey, Surrey (GB); Andrew Stephen Ackland, Hampshire (GB)

(73) Assignee: UWB X LIMITED, Warrington (GB)

(*) Notice: Subject to any disclaimer, the term of this patent is extended or adjusted under 35 U.S.C. 154(b) by 0 days.

(21) Appl. No.: 18/450,870

(22) Filed: Aug. 16, 2023

(65) Prior Publication Data

US 2024/0153691 A1 May 9, 2024

Related U.S. Application Data

(62) Division of application No. 16/317,011, filed as application No. PCT/GB2017/000106 on Jul. 11, 2017, now Pat. No. 11,763,974.

(30) Foreign Application Priority Data

Jul. 11, 2016 (GB) ..................................... 1612032

(51) Int. Cl.
*H01F 27/29* (2006.01)
*H01F 19/04* (2006.01)
(Continued)

(52) U.S. Cl.
CPC ............ *H01F 19/08* (2013.01); *H01F 19/04* (2013.01); *H01F 21/12* (2013.01);
(Continued)

(58) Field of Classification Search
CPC ...................................................... H01F 19/08
(Continued)

(56) References Cited

U.S. PATENT DOCUMENTS 2,272,731 A * 2/1942 Swart ...................... E05F 15/63 336/170
3,729,694 A 4/1973 Huntington et al.
(Continued)

FOREIGN PATENT DOCUMENTS

GB 1233894 A 6/1971
GB 2254195 A 9/1992
(Continued)

OTHER PUBLICATIONS

International Search Report, mailed Nov. 8, 2017, for International Application No. PCT/GB2017/000106. (6 pages).
(Continued)

*Primary Examiner* — Ronald Hinson

(57) ABSTRACT

An Isolating Transmission Line Transformer (ITLT) for use in a data communications system is provided, the transformer comprising: a substantially planar substrate formed of electrically insulative material having opposed first and second surfaces; a first port formed of two separate terminals provided at one part of the substrate; a second port formed of two separate terminals provided at a second part of the substrate; a first conductor connected in series to the first port and arranged as a single loop; a second conductor which is electrically isolated from the first conductor and connected in series to the second port, the second conductor being arranged as a single loop in a substantially opposite orientation to the first conductor; wherein the first and second ports and at least part of the first and second conductors are provided on the substrate surface(s); and a core arranged between the first and second ports to cover the majority of the first and second conductors.

16 Claims, 22 Drawing Sheets

(51) Int. Cl.

| | |
|---|---|
| ***H01F 19/08*** | (2006.01) |
| ***H01F 21/12*** | (2006.01) |
| ***H01F 27/28*** | (2006.01) |
| ***H01F 41/04*** | (2006.01) |

(52) U.S. Cl.
CPC ..... *H01F 27/2804* (2013.01); *H01F 27/2823* (2013.01); *H01F 27/29* (2013.01); *H01F 41/041* (2013.01); *H01F 2019/085* (2013.01); *H01F 2027/2814* (2013.01); *H01F 2027/2819* (2013.01); *H01F 2027/2833* (2013.01)

(58) Field of Classification Search
USPC .................................................. 336/192, 200
See application file for complete search history.

(56) References Cited

U.S. PATENT DOCUMENTS

| | | | | |
|---|---|---|---|---|
| 3,882,432 | A * | 5/1975 | Bowman | H01F 19/06 333/32 |
| 4,288,759 | A | 9/1981 | Stover | |
| 4,342,976 | A | 8/1982 | Ryser | |
| 4,538,132 | A | 8/1985 | Hiyama et al. | |
| 5,140,706 | A * | 8/1992 | Maeda | H03D 7/1408 336/229 |
| 5,200,718 | A * | 4/1993 | Kato | H03H 7/42 333/32 |
| 5,214,392 | A * | 5/1993 | Kobayashi | H03F 3/38 330/10 |
| 5,790,005 | A | 8/1998 | Santi et al. | |
| 6,026,004 | A | 2/2000 | Cross | |
| 6,489,878 | B2 | 12/2002 | Baarman et al. | |
| 6,952,153 | B2 | 10/2005 | Jacobson et al. | |
| 7,332,993 | B1 | 2/2008 | Nussbaum | |
| 7,468,648 | B2 | 12/2008 | Springett | |
| 7,924,130 | B2 | 4/2011 | Buckmeier et al. | |
| 8,310,329 | B1 | 11/2012 | Herbert | |
| 8,456,267 | B2 | 6/2013 | Schoessow | |
| 8,576,037 | B1 * | 11/2013 | Ji | H01F 30/04 336/215 |
| 2004/0129446 | A1 * | 7/2004 | Kazama | H01F 30/16 174/90 |
| 2006/0152326 | A1 | 7/2006 | Fenner et al. | |
| 2007/0024264 | A1 * | 2/2007 | Lestician | H01F 27/343 323/355 |
| 2008/0278168 | A1 | 11/2008 | Weiss et al. | |
| 2010/0007358 | A1 | 1/2010 | Schaerrer et al. | |
| 2010/0134229 | A1 * | 6/2010 | Ueki | H01F 21/06 336/119 |
| 2011/0012691 | A1 * | 1/2011 | Schoessow | H01F 17/06 333/24 R |
| 2011/0050004 | A1 * | 3/2011 | Johansen | H01F 27/38 307/412 |
| 2011/0279209 | A1 * | 11/2011 | Schoessow | H01F 27/29 336/192 |
| 2012/0081202 | A1 | 4/2012 | Nanayakkara et al. | |
| 2014/0347154 | A1 | 11/2014 | Schmelzer et al. | |
| 2014/0347158 | A1 | 11/2014 | Goeke et al. | |
| 2015/0270057 | A1 * | 9/2015 | Lestician | H01F 27/2823 323/361 |
| 2015/0332838 | A1 | 11/2015 | Blanke | |
| 2017/0345756 | A1 | 11/2017 | Yin et al. | |

FOREIGN PATENT DOCUMENTS

| | | | |
|---|---|---|---|
| GB | 2534233 | A | 7/2016 |
| KR | 100778092 | B1 | 11/2007 |
| WO | WO 9854781 | A1 | 12/1998 |
| WO | WO 0060694 | A1 | 10/2000 |

OTHER PUBLICATIONS

Sevick, J., "Transmission Line Transformers," *Noble Publishing Corporation*, 4th Edition, 2001. (289 pages).

UKIPO Search Report, date of search Dec. 12, 2017, for Application No. GB1711158.4. (1 page).

Written Opinion, mailed Nov. 8, 2017, for International Application No. PCT/GB2017/000106. (9 pages).

* cited by examiner

ISOLATING TRANSFORMER

FIELD OF THE INVENTION

This invention relates to an isolating transformer, particularly though not exclusively an isolating transmission line transformer (TLT) at least part of which is provided on a substantially planar substrate, for example a printed circuit board (PCB) or flexible PCB for use within a data communications circuit or system. The invention also relates to a method of constructing an isolating transformer.

BACKGROUND OF THE INVENTION

Data communications and measurement equipment is often required to couple broadband signals to and from transmission lines with some D.C. and low frequency isolation, e.g. to reject common mode signals such as mains hum in 'earth loops'. A D.C. isolating transformer is commonly employed for this purpose.

It is generally accepted, however, that the parasitic reactance of such known transformers will limit the upper usable frequency ($f_U$) that may be communicated over the transmission line by introducing loss and mismatch. Further, the lower frequency limit ($f_L$) will be limited by a shunt reactance to make it difficult to increase the ratio $f_U/f_L$ beyond a certain limit, typically 100,000. There is therefore placed a limitation on the achievable overall bandwidth.

Another form of transformer is a Transmission line Transformer (TLT) in which the physical properties of the wires used for the transformer windings are considered and disposed in such a way as to also form part of a transmission line.

Currently, only conventional isolating transformers are used in local and wide-area networks (LANs and WANs) and, in their current form, by virtue of the above characteristics, these limit bandwidth and are therefore not conducive to optimising the potential benefits of high speed networks, fibre optic backbones and networks, for example.

Further information on TLTs is described in Sevick, J., Transmission Line Transformers, Noble Publishing Corp., $4^{th}$ edition, 2001 but this reference does not refer to an Isolating TLT.

U.S. Pat. No. 8,456,267 discloses an isolating TLT exhibiting a high impedance port, typically to couple analogue radio equipment to high impedance antennas, without significant loss.

U.S. Pat. No. 7,924,130 discloses an isolation magnetic device having a single port and with multiple windings, the latter of which limits the upper frequency to an estimated 2 GHz operation. The device disclosed therein has disadvantages in that it may not meet isolation and return loss specifications for stable transmission in addition to producing a variation in performance, e.g. between individual Ethernet lanes and from device to device.

Transformers of the type mentioned above are generally required to be assembled by hand, which limits production scales. Also, the upper bandwidth is limited by the multiple windings used to achieve bandwidth, typically to no more than 2 GHz which limits data speeds. Also, a common mode data choke may be required.

SUMMARY OF THE INVENTION

In a broad sense, there is provided an Isolating Transmission Line Transformer (ITLT) for use in data communications, the ITLT being arranged with first and second ports connected to respective first and second windings, the ports being d.c. isolated from one another.

According to one aspect, there is provided an isolating transformer for use in data communications, the transformer comprising:

a substantially planar substrate formed of electrically insulative material having opposed first and second surfaces;

a first port formed of two separate terminals provided at one part of the substrate;

a second port formed of two separate terminals provided at a second part of the substrate;

a first conductor connected in series to the first port and arranged as a single loop;

a second conductor which is electrically isolated from the first conductor and connected in series to the second port, the second conductor being arranged as a single loop in a substantially opposite orientation to the first conductor;

wherein the first and second ports and at least part of the first and second conductors are provided on the substrate surface(s); and a core arranged between the first and second ports to cover the majority of the first and second conductors.

According to a second aspect, there is provided an isolating transformer for use in a data communications system, the transformer comprising:

a planar substrate formed of electrically insulative material having opposed first and second surfaces and substantially opposite edges;

a first port formed of two separate terminals located at or close to a first edge;

a second port formed of two separate terminals located at or close to a second, substantially opposite edge;

a cut-out portion in the substrate between the first and second ports;

a core provided in the cut-out portion, the core having first and second ends with first and second channels extending between the ends; and first and second generally U-shaped conductive paths connected in series to the first and second ports respectively, said paths being electrically isolated from one another and each path being comprised of (i) first and second tracks on the substrate surface which extend from their respective port terminals towards one end of the core, (ii) a pair of wires which connect to the first and second tracks and which pass through the respective core channels to the other end of the core, and (iii) a third track on the substrate surface which interconnects the pair of wires at the other end of the core.

According to a third aspect, there is provided a method of manufacturing an isolating transformer, the method comprising:

providing a substantially planar substrate formed of electrically insulative material having opposed first and second surfaces;

providing at one part of the substrate first port formed of two separate terminals;

providing at a second part of the substrate a second port formed of two separate terminals;

providing a first conductor connected in series to the first port and arranged as a single loop;

providing a second conductor which is electrically isolated from the first conductor and connected in series to the second port, the second conductor being arranged as a single loop in a substantially opposite orientation to the first conductor;

wherein the first and second ports and at least part of the first and second conductors are provided as tracks on the substrate surface(s); and providing a core between the first and second ports to cover the majority of the first and second conductors.

According to a fourth aspect, there is provided a method of manufacture of an isolating transformer, the method comprising:

providing a substantially planar substrate formed of electrically insulative material having opposite first and second surfaces;

arranging onto part of the substrate:

a first port formed of two separate terminals;

a second port formed of two separate terminals;

a first conductive track connected in series to the first port and extending over the first substrate surface as a single loop;

a second conductive track which is electrically isolated from the first conductor and connected in series to the second port, the second conductor extending over the second substrate surface as a single loop in a substantially opposite orientation to the first conductor; and providing a core which in use covers the majority of the first and second conductors.

Preferred aspects are defined in the dependent claims.

BRIEF DESCRIPTION OF THE DRAWINGS

The invention will now be described, by way of non-limiting example, with reference to the accompanying drawings, in which.

DETAILED DESCRIPTION OF PREFERRED EMBODIMENTS

Embodiments herein describe an isolating transformer, which is more preferably a transmission line transformer (hereafter "ITLT") and method of manufacture thereof.

The ITLT is formed by depositing, using known methods, conductive tracks or strips in a particular configuration onto both sides of a planar and insulative substrate such as a printed circuit board (PCB) or flexible PCB (flexi-PCB). This permits the ITLT to be produced efficiently using known PCB manufacturing methods, useful for mass production, whilst achieving an improved performance over known ITLTs. The production process may be entirely automated and requires no hand assembly. The resulting structure is also relatively compact and can be more easily interfaced with communications equipment, e.g. broadband and measurement equipment, commonly provided on PCBs. The resulting ITLT can achieve a bandwidth well above 2

GHz and is suitable for data speeds needed for 40G, 100G plus operation. A speed/bandwidth of 200G/10 GHz plus has been demonstrated. Also, the ITLT lower frequency performance is improved, and can be adjusted e.g. from 160 μH/1G to 3.8 μH/200G depending on the number of beads used, which is useful for internet transceiver performance, achieving variable open circuit inductances. The ITLT does not require a common mode choke. It also negates the need to integrate or terminate the transformer using the standard “Bob Smith” protocol.

The ITLT in some embodiments may be used with data communications systems. The ITLT, by virtue of its design and construction, provides d.c. isolation with substantially seamless coupling between a source of data at one port and another data transmission means at the other port, particularly a transmission line (or data receiver line) for onwards transmission (or reception) of the data. In some embodiments, multiple ITLTs may be used to couple multiple transmission or reception lines together with regeneration to provide transmission and reception over greater distances.

Advantageously, the ITLT of the present design and construction may permit data transmission and reception speeds with a much higher data rate than is conventionally known or available, whilst keeping the usable frequency relatively constant, or controllable. This may provide a greater overall bandwidth than is currently available (the current bandwidth typically being in the order of 100,000 times the lower usable frequency).

Figure 1:
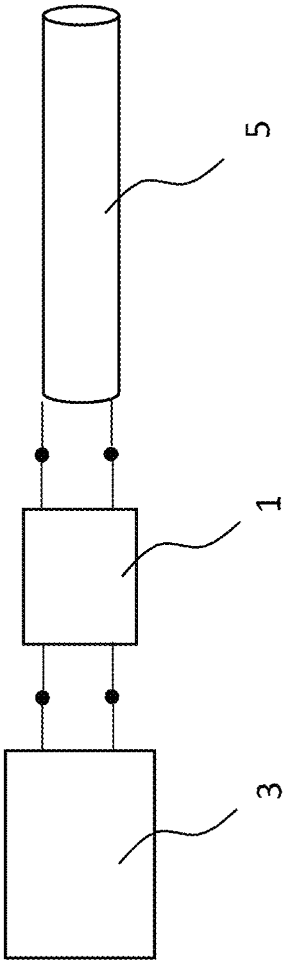
FIG. 1 is a system block diagram showing a data source coupled to a transmission line via a transmission line transformer.

FIG. 1 shows a typical system in which the ITLT can be employed, comprising a digital data source 3 or a digital data receiver 3, the ITLT 1, and a transmission line 5 which provides transmission of the data to or from the distant end. The digital data source or receiver 3 is connected to the ITLT 1 by respective two-terminal ports, and the ITLT to the transmission line 5 by respective two-terminal ports, as shown.

The data source or receiver 3 can be a computer (e.g. a PC or laptop), a data network, whether a LAN or WAN, audio equipment, digital television/video, telecommunications equipment or test and measurement equipment, to give some examples. Any source of digital data operating at broadband speeds can be used, particularly speeds above 256 kbit/s and potentially up to 100 Gbit/s, and potentially beyond. The current state of the art limits current broadband bandwidth to the order of 1000 MHz (10G Base-T for example is limited to 500 MHz) whereas embodiments described herein may enable the bandwidth to be increased to 5000 MHz and upwards.

The electrical transmission line used in the construction of the ITLT 1 can, in general, be any form of transmission line, such as parallel line, coaxial cable, stripline and microstrip, PCB or Flexi-PCB and the like. The transmission line 5 can be embodied on a surface mounted integrated circuit (IC) or chip.

A particularly advantageous PCB or Flexi-PCB arrangement and manufacturing method will be described later on.

The ITLT 1 comprises the first and second ports, and at least two conductors forming a transmission line, wherein each conductor is wound about a core, e.g. a toroidal ferrite core, to provide first and second coils formed of adjacent windings, the first conductor being connected in series to the first port and the second conductor being connected in series to the second port. By virtue of this structure, there is d.c. and some low-frequency isolation between the ports, as is required, for example to reject common-mode signals such as mains hum in earth loops.

As will be explained below, the transmission line of the ITLT 1 will have a known characteristic impedance Zo, this being provided by the manufacturer of the transmission line and/or which can be measured. By virtue of the design and arrangement of the ITLT 1, the characteristic impedance(s) $Z_1$ and $Z_2$ which is/are presented at the first and second ports may be the same or different than Zo. Ultimately, however, it is important in the present context for the port characteristic impedances $Z_1$ and $Z_2$ to substantially match the respective resistive impedances of the data source or receiver 3 and the transmission line 5. This will ensure seamless, or near seamless coupling by minimising reflections and therefore loss.

As will be appreciated, in conventional transformers, the characteristic port impedance(s) is or are frequency dependent and hence there is a limitation on usable bandwidth, particularly the upper usable frequency $f_U$.

In the present embodiment, the design and arrangement of the ITLT 1 is such as to provide a relatively flat characteristic impedance and frequency response over a much wider bandwidth than conventional isolating transformers.

Figure 2:
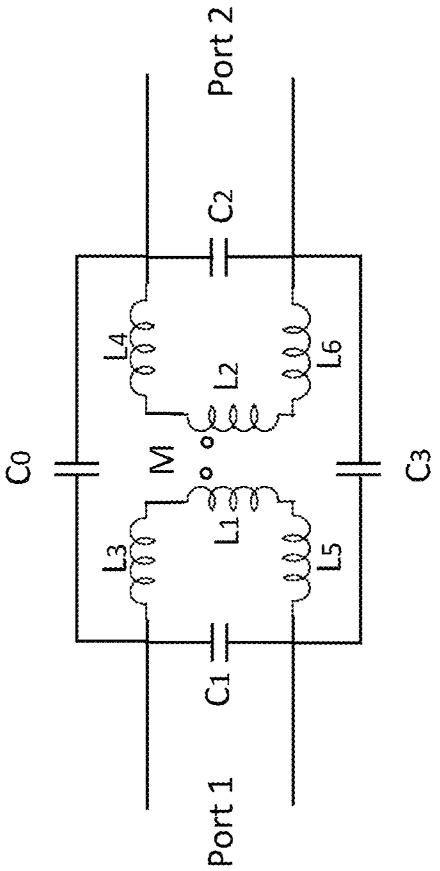
FIG. 2 is a schematic diagram of a typical lumped transformer model, showing parasitic elements, which is useful for understanding the invention.

For context, FIG. 2 depicts in schematic form a typical lumped model of an isolating transformer, or TLT, which is useful for understanding the limiting behaviour of conventional Isolating Transformers or TLT’s. L1 and L2 represent the physical coils formed of multiple windings, which provide mutual inductance M, whereas the additional elements L3, L4, L5, L6, C0, C1, C2 and C3 represent parasitic elements that limit performance, particularly high frequency performance.

In this embodiment, we provide, and will describe, an ITLT with a 1:1 impedance transformation ratio, i.e. whereby the characteristic impedances $Z_1=Z_2$ are appropriate where the data source or receiver 3 and transmission line 5 have the same characteristic impedance for seamless connection. However, it will be appreciated that other transformation ratios can be used, e.g. 1:2, 1:4, 1:9, 4:1, 9:1, Further the ITLT is not limited to just two ports, and multi-port topologies can be employed.

Figure 3:
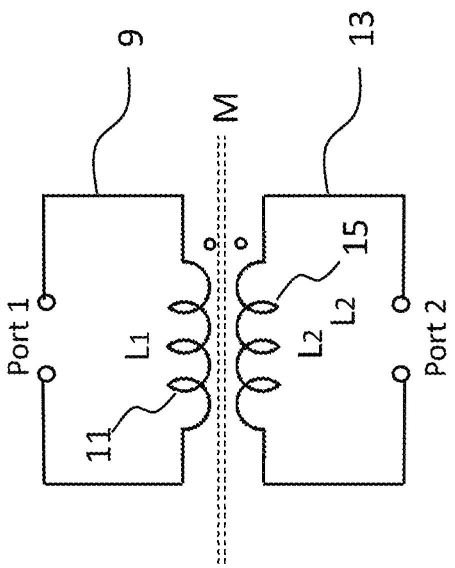
FIG. 3 is a schematic diagram of a typical isolating transformer that is characteristically dispersive and of limited bandwidth, which is useful for understanding the invention.

FIG. 3 shows an embodiment of a commonly used TLT alternative for an Isolating Transformer that typically does not produce characteristic impedances at its ports, nor a constant transmission delay between them and as a result is necessarily dispersive and of limited bandwidth.

Figure 4:
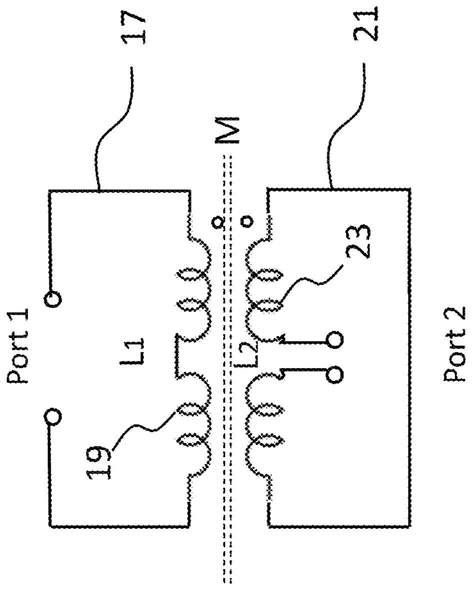
FIG. 4 is a schematic diagram of a different isolating transmission line transformer, which is useful for understanding the invention.

FIG. 4 is an embodiment of an ITLT which is useful for understanding the invention, formed of a first conductor 17 connected in series to first and second terminals of a first port (Port 1) and wound around a core to provide a first coil 19 formed of a plurality of windings. A second conductor 21 is connected in series to first and second terminals of a second port (Port 2) and wound around the core to provide a second coil 23 formed of the same number of windings. The ITLT provides a 1:1 transformation ratio. The dotted lines between the coils 19,23 indicate that the coils physically form a transmission line and indeed in this embodiment are formed by a length of RG179 Coaxial Cable of characteristic impedance 50 ohms, although other forms of transmission line with other characteristic impedances can be used. It will be noted that this embodiment of an Isolating TLT employs a different topology in that the second port (Port 2) has a centre output point (tap) within the second coil 23, which is found to be advantageous. In some embodiments, the second port may be slightly off-centre.

In FIG. 4, at the physical, constructional level, windings 19 and 23 are arranged around the core in such a way as to form a transmission line between them.

Figure 7A:
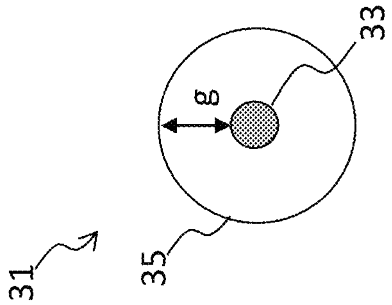
FIGS. 7A and 7B show cross-sectional and axial views of a coaxial cable transmission line which is useful for understanding the invention.
Figure 7B:
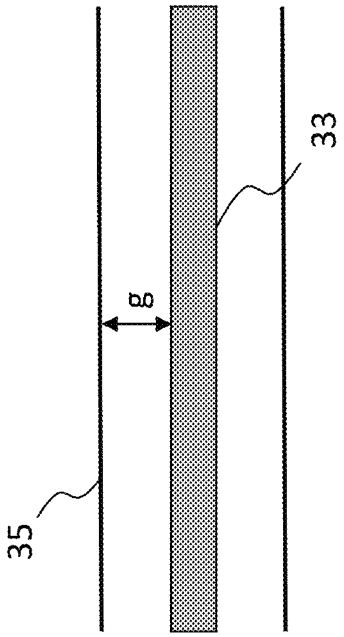

FIG. 7A shows the cross-section of a coaxial cable 31 employed in this embodiment which is useful for understanding the invention, which is used for the first and second coils 19, 23, although alternative transmission lines can be used. As will be appreciated, a coaxial cable comprises an inner conductor 33, surrounded by a tubular insulating layer, surrounded by a tubular conducting shield 35. FIG. 7B shows the cable 31 along part of its axial length. The gap "g" between the outer surface of the core 33 and the inner surface of the outer shield 35 is substantially constant throughout the length, this being the inter-winding gap. The inner conductor 33 in this case provides the first coil 19 and the shield 35 the second coil 23.

Figure 8A:
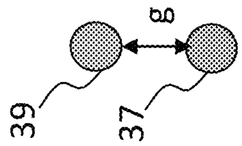
FIGS. 8A and 8B show cross-sectional and axial views of a twin transmission line which may is useful for understanding the invention.
Figure 8B:
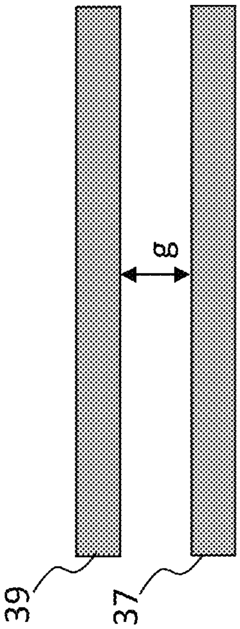

FIGS. 8A and 8B show the cross-sectional areas of a twin transmission line which is an additional example of what can be used in the construction of the coils for TLT 1 and the relationship of the respective gap.

Figure 9:
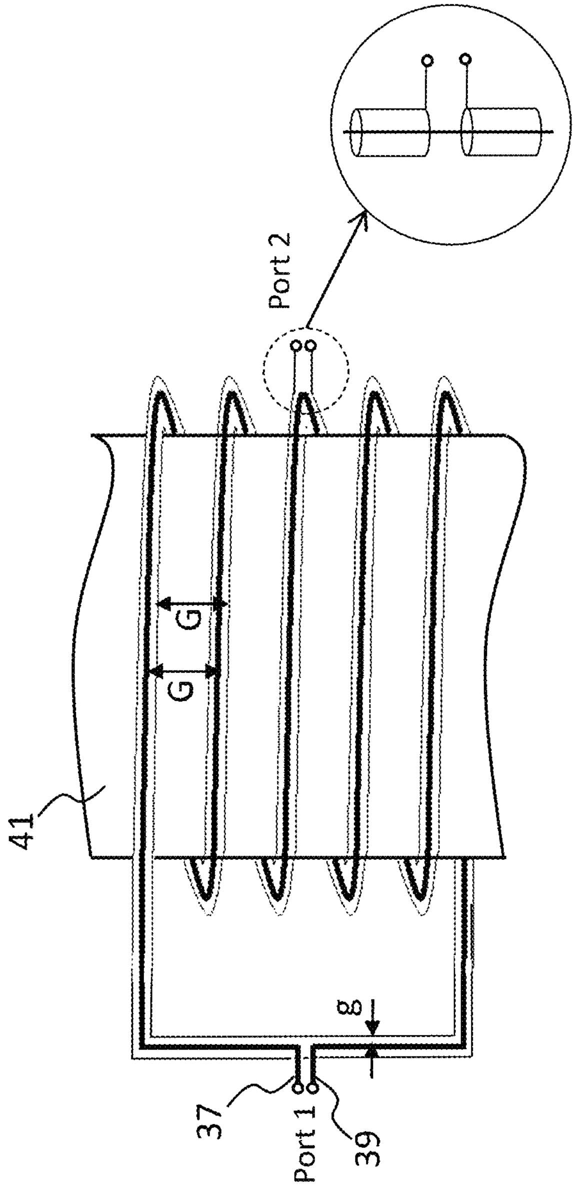
FIG. 9 is a perspective view of a physical implementation of the FIG. 4 transformer.

Referring to FIG. 9, an example of how the coaxial cable which can be used in the FIG. 4 embodiment is physically arranged around a core 41, as well the ports. In this case, a cylindrical core 41 is shown in part, although a toroidal core can be employed. The inter-winding gap g between the conductors is maintained constant throughout the entire length of the coil around the core, as is intra-winding gap G.

Figure 5:
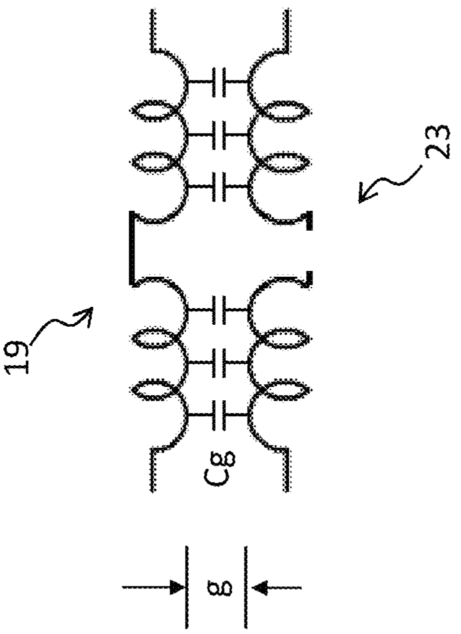
FIG. 5 is a close-up view of the coils of the FIG. 4 embodiment, indicating an inter-winding gap and stray capacitances.
Figure 6:
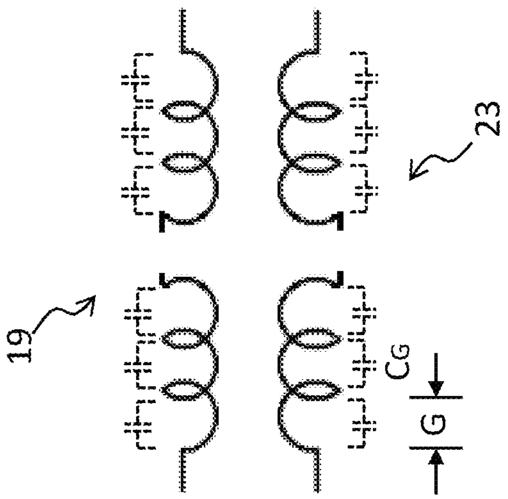
FIG. 6 is another close-up view of the coils of the FIG. 4 embodiment, indicating the intra-winding gap and stray capacitances.

Referring back to FIGS. 5 and 6, as a result of this physical arrangement, the stray inter and intra-winding capacitances $C_g$ and $C_G$ are constant and distributed. The inter-winding stray capacitance $C_g$ is subsumed into the transmission line formed by the two coils (FIG. 4) 19, 23 and is inversely proportional to the inter-winding gap g. The intra-winding stray capacitance $C_G$ in this structure is inversely proportional to the intra-winding gap G. Increasing this gap G has the effect of increasing the upper frequency limit and therefore the bandwidth.

In some embodiments, the conductors of the coils (FIG. 4) 19, 23 are of constant cross-section and therefore of constant surface area.

In some embodiments, the dimensions of the core are also relevant, in that inductance can be controlled by changing the dimensions; reducing one or both of the core diameter and/or length. This has the effect of decreasing or increasing the lower frequency (OCL). The material of the core is also relevant, in one embodiment of the invention a ferrite core with selected permeability, for example 10000μ is used. Alternatively, in other embodiments, other permeabilities and types of materials may be used, such as e.g. MnZn and NiZn.

In some embodiments, the length and the construction of the winding can also be used to control bandwidth, in that the shorter the length of the winding, the higher the usable upper frequency (fU). Overall, therefore, there is an incentive to miniaturise.

Returning to the specific embodiment shown schematically in FIG. 4, using this 1:1 topology, employed physically using a 1.2 metre length of RG179 50 ohm coaxial cable, with the abovementioned constant inter and intra gap spacing wound around the core, a 5.1 mH magnetising inductance was recorded. It was also observed through measurement that there was no upper frequency limit observed or at least a very high upper frequency limit using the particular test signal.

It was also observed that this embodiment, demonstrated a substantially constant characteristic impedance Zo of 100 ohms and a transit delay of 6 nS, independent of frequency above the low frequency cut-off fl, which was 1.5 kHz.

This result is not consistent with traditional Isolating Transformers and TLT models. Indeed, applying the numerical parameters to traditional distributed parameter models gave a predicted upper frequency limit in the order of 1/(2×6nS) of 83 MHz. However, with this embodiment, no such upper limit was observed. FIG. 4 provides in schematic form a model more consistent with these findings, indicating a way of designing and constructing an ITLT for seamless connection between a source and transmission line to provide greater bandwidth. Further, by cascading multiple transmission lines using such ITLTs and a shunt magnetising inductance provides an increase in the magnitude of (fU) in comparison to well-known and current predictive models.

Reflections captured from the input port (Port 1) were found to indicate a constant resistive characteristic impedance and a constant transport delay (time delay) in much the same way as a transmission cable does. In the embodiment shown in FIG. 4, the characteristic impedance at both ports was found to be twice that of the characteristic impedance Zo of the transmission line used to form the Isolating TLT, using the 1:1 topology. So, in this case, 100 ohms characteristic impedance was presented at both outputs, making this Isolating TLT suitable for connection to a 100 ohm data source and receiver 3 and 100 ohm transmission line 5, with the resultant matching being maintained over the wide bandwidth.

It was deduced that the TLT (d.c. isolation aside) could be accurately modelled by a shunt inductance, i.e. the magnetising inductance of the core, in series with the transmission line segments (L-section, T-section and/or Pi-section models would work in this regard). As such, it is possible to construct a TLT for d.c. isolation that offers very wide bandwidth, with a substantial increase in fU which in itself appears to be limited only by the transmission line loss itself.

This embodiment, as mentioned, provides a substantially constant and resistive characteristic impedance at Ports 1 and 2. The leakage inductance of a conventional isolating transformer and TLT is modelled as a lumped element inductance that is not inductively coupled to anything else and which appears in series with the 100% coupled mutual inductances of the conventional isolating transformer and TLT. In the present embodiment, however, indications are that whilst there are still leakage inductances, these do not appear (when modelled) as a single lumped element at the ports, but are distributed. They appear, or are modelled, as a series of small incremental inductances, not coupled to anything else, and distributed between incremental spaced elements of mutual inductance and incremental spaced elements of inter-winding capacitance. This model results in a ladder network of series inductances (Ls) in the two legs of the windings linked by shunt capacitive elements interspersed with mutually spaced inductive elements. This ladder network can be recognised as being identical, or substantially identical, to the incremental lumped element model of an actual transmission line, with unsurprisingly the same properties in common therewith, namely a characteristic impedance that is constant and a transmission term that is substantially a constant propagation delay. In summary, this embodiment has taken the lumped parasitic leakage inductance (L) and the inter winding capacitance (C) of traditionally constructed isolating transformers/TLTs with primary and secondary coils wound on a core) and distributed these as the distributed L and C of a transmission line with characteristic impedance SQRT (L/C) by winding the primary and secondary coils together as a transmission line.

In terms of a specific design using FIG. 4 topology, therefore, being 1:1, the choice of transmission line with which to construct the Isolating TLT should have a characteristic impedance half that of the impedances required at the ports, i.e. those of the data source and receiver 3 and the transmission line 5. The resulting matching remains flat over a wide frequency band, as does the observed transmission delay. The only observed significant component of the reflections induced at the ports are due to the intrinsic shunt magnetising impedance of the Isolating TLT. However, these reflections due to parasitic leakage inductance and the inter-winding capacitance of a traditional (non-TLT) isolating transformer have been substantially, or completely, subsumed into the constant resistive characteristic impedance and transmission delay of this ITLT. The notable result of this is the substantial increase in upper frequency/bandwidth, limited only by the loss of the transmission cable 5 it is connected to, the bandwidth of the circuits and other logic components it is being integrated with, and the shunt magnetising impedance of the Isolating TLT.

The factor of the relationships between characteristic impedance at the ports, and that of the constituent transmission line of the 1:1 ITLT also means that using two transmission lines of characteristic impedance Zo, connected in parallel, can provide an overall composite Isolating TLT with a characteristic impedance substantially equal to Zo at the ports. This is of benefit in that transmission lines with commonly available characteristic impedances (e.g. 50 ohm) can be used between systems requiring the same impedance, e.g. 50 ohm, notwithstanding the aforementioned relationship. So, by connecting two 1:1 Isolating TLTs (as depicted in FIG. 4) in parallel, to provide a composite Isolating TLT, the use of 50 ohm transmission line for the Isolating TLTs will provide 50 ohms at the first and second ports.

More than two parallel Isolating TLTs can be used for similar purposes, to provide the required impedances at the ports. More than two ports can also be provided, where required.

To recap, ($f_L$) is maintained by the shunt magnetising impedance, which is inversely proportional to the intrinsic magnetising inductance. This magnetising inductance increases with the increasing inductance factor of the core, and as the square of the number of turns. The upper frequency limit due to the shunt magnetising impedance is due in turn to (parasitic) intra-winding capacitances of the coils, distinct from the inter-winding capacitance between coils. The upper frequency limit is inversely proportional to the intra-winding capacitance. The intra-winding capacitance can be beneficially reduced, further increasing the upper frequency limit (fU) by reducing the length and diameter of the constituent transmission line from which the embodiment is constructed. This, taken together, means that miniaturisation of the embodiment is effectively increasing the upper frequency limit without further increasing the lower frequency limit to the extent that the magnetising inductance can be maintained during miniaturisation, e.g. by keeping the number of turns constant while maintaining the reluctance of the core constant, i.e. for a give core material, maintaining the ratio of magnetic path cross-section and length. This process is constrained only by the need to avoid excessive loss, e.g. Cu loss of thin conductors, and the power handling capability of the ITLT as the ITLT will need to be of a certain minimum size in order to handle a given amount of power without distortion and/or destruction.

FIGS. 10A, 10B, 11A and 11B provide a more generalised comparison between the topologies of the known and present embodiment transformers, as previously introduced in relation to FIGS. 3 and 4 respectively, although using only single windings for each wire for reasons to be explained.

Figure 10B:
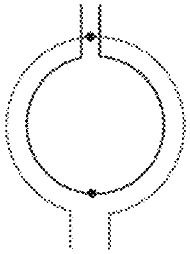
FIG. 10B is a topological representation of a transmission line transformer in accordance with the invention.
Figure 11B:
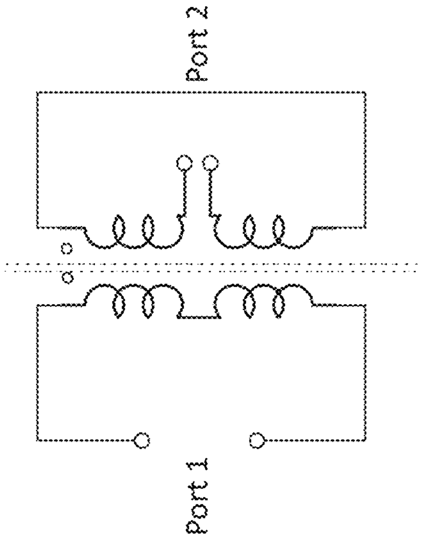
FIG. 11B is an alternative topological representation corresponding to FIG. 10B.
Figure 10A:
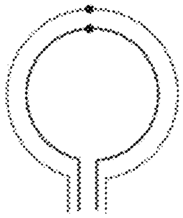
FIG. 10A is a topological representation of a known transmission line transformer.
Figure 11A:
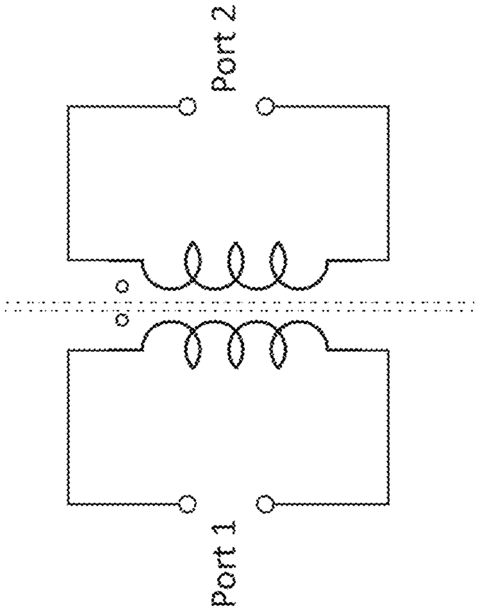
FIG. 11A is an alternative topological representation corresponding to FIG. 10A.

Of note is that in the known, FIGS. 10A and 11A embodiments, the characteristic impedance is not constant, and bandwidth is limited.

The FIGS. 10B and 11B topologies indicate a significant attribute of the present embodiment, which is that there are two ports which are, mechanically and topologically, opposite. This produces a constant resistive impedance and increased bandwidth.

Figure 12:
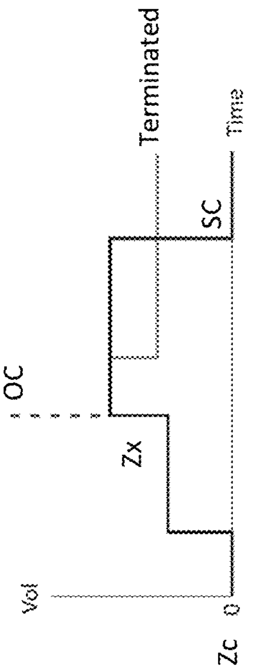
FIG. 12 is a performance graph showing reflection delays relating to a known transmission line transformer.

Referring to FIG. 12, a graphical indication of the voltage versus time response for the known FIG. 3/11A transformer is shown, in which Zc is the characteristic impedance of the transmission line, e.g. 100 ohms, and Zx is the characteristic impedance of the transformer. OC and SC represent Open Circuit and Short Circuit conditions respectively. As FIG. 12 shows, the FIGS. 3 (and 11A) embodiment has a different termination point that results in a significant reflection that causes a change in the impedance thus limiting the bandwidth of the transformer.

Figure 13A:
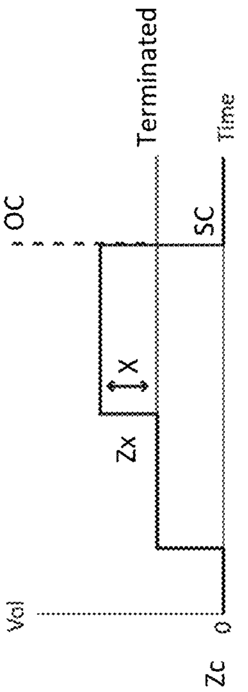
FIGS. 13A and 13B are performance graphs relating to minute or smaller reflection delays in a transformer in accordance with the invention.
Figure 13B:
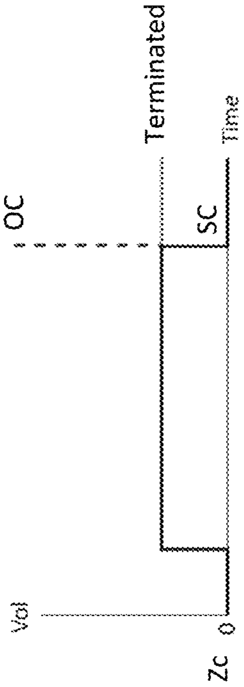

Referring to FIGS. 13A and 13B, the response for the FIG. 4/11B transformer is shown. Referring to FIG. 13A, the termination point is different, and although X shows some ambiguity between transformer and transmission line, for presentation purposes only the net result of the FIG. 4/11B topology is shown in FIG. 13B which is a substantially seamless transmission line transformer.

For optimal performance, in further embodiments, as well as having the ports at opposite ends, mechanically speaking, a single turn or winding is employed, which it has been discovered, may take the upper frequency beyond 2 GHz and beyond 10 GHz.

Figure 14B:
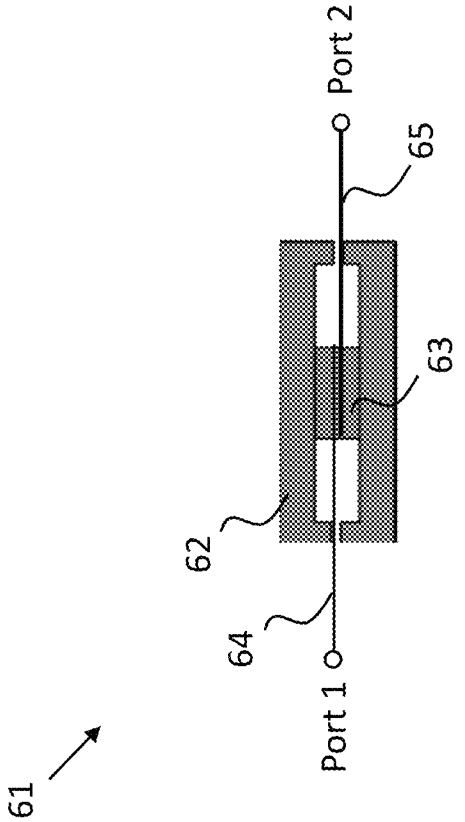
FIGS. 14A and 14B are top plan and side views of a physical implementation of a transformer which is useful for understanding the invention.
Figure 14A:
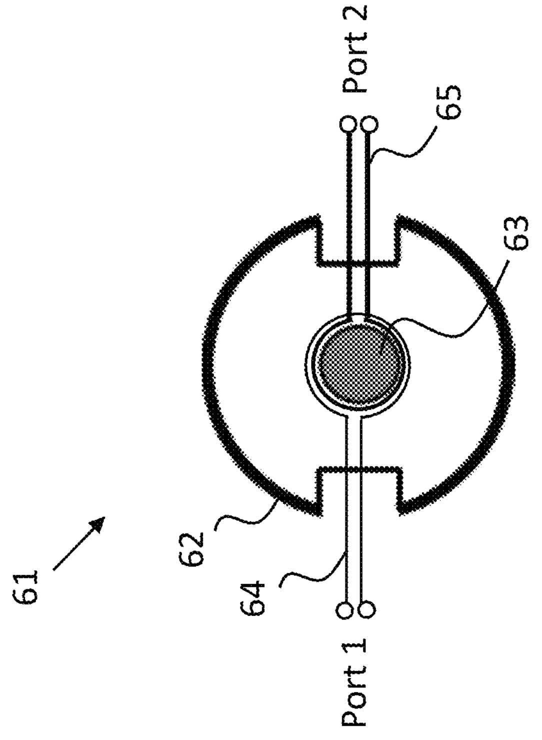

FIGS. 14A and 14B show such an embodiment 61 of the invention, employing a pair of conductors 64, 65 wound around the central part 63 of a ferrite pot core 62, each conductor extending between mechanically opposite ports 1 and 2, and executed using a single turn or winding, following the FIG. 4/11B topology. There is no intra winding capacitance, and it does not limit low/high bandwidth combinations. The conductors are insulated from one another, and preferably have a substantially constant gap.

In an embodiment which is useful for understanding the invention, the pot core 62 has a diameter of approximately 12.5 mm and the diameter of the central part 63 has a bore of approximately 0.2 mm. The permeability of the ferrite material is approximately 10,000μ. This embodiment exhibits under testing an open circuit inductance (OCL) of 160 μH and a bandwidth of 10 GHz. Variations of one or more of these parameters may provide higher bandwidths.

Figure 15:
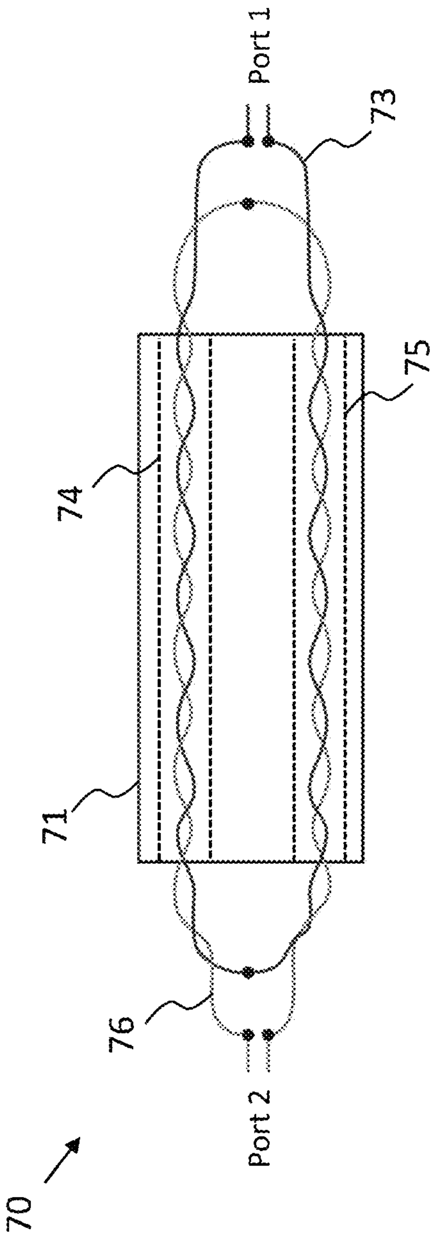
FIG. 15 is a sectional view of an alternative physical implementation which is useful for understanding the invention, which employs a bead/binocular core.
Figure 16:
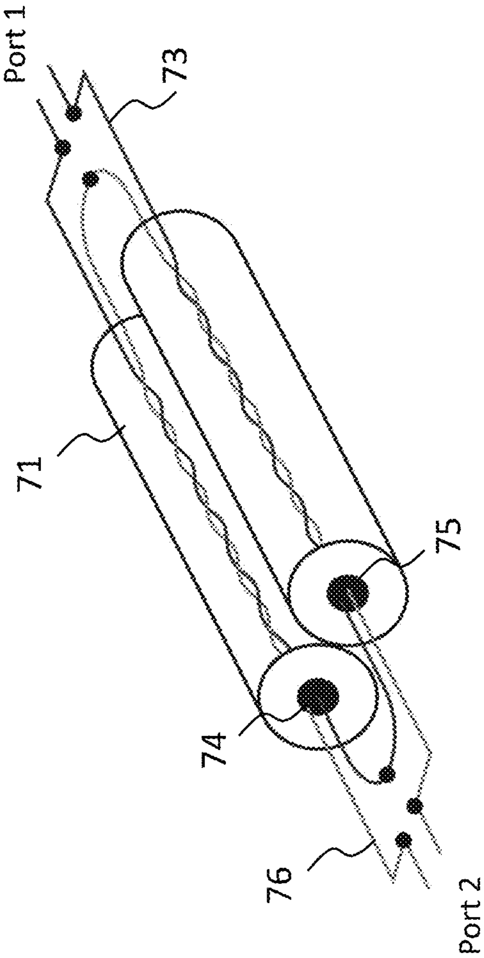
FIG. 16 is a perspective view of the FIG. 15 implementation.
Figure 17:
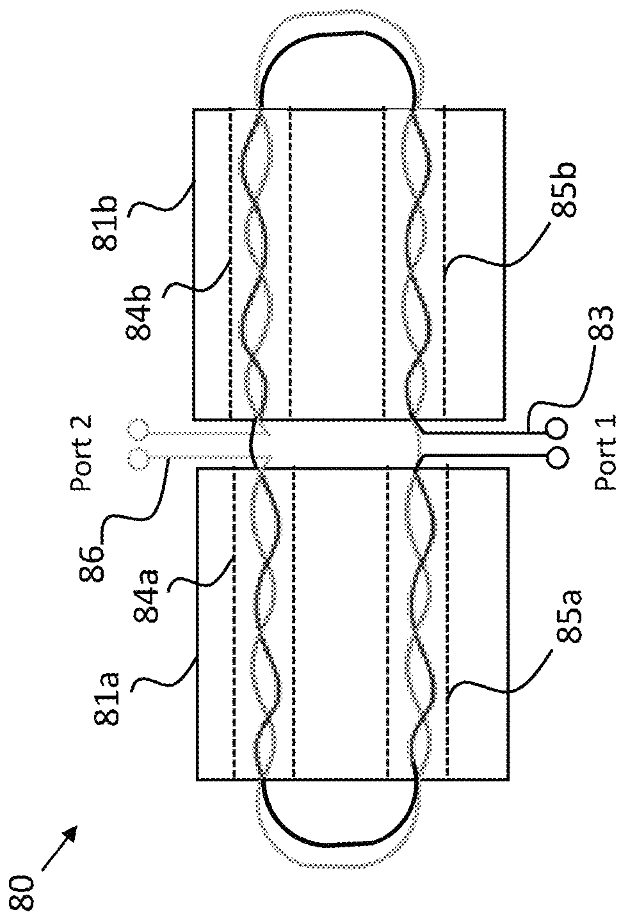
FIG. 17 is a sectional view of an alternative physical implementation which is useful for understanding the invention, which employs a two bead or binocular transformer.

Referring now to FIGS. 15 to 17, alternative practical embodiments of the above are shown and described in terms of how they may be manufactured and produced.

Referring to FIG. 15, a top view of such a transformer 70 is shown. It comprises a binocular (or bead) core 71 with two parallel bores 74, 75 through which twisted conductors 73, 76 pass to provide a transmission line. The core can actually be toroidal, binocular or a pot, but a binocular core provides a natural fit for the present embodiment(s).

A first port (Port 1) is provided to one side of the core 71, and comprises a first conductor 73 which runs from one port terminal, through the first bore 74, whereafter it exits and returns back through the second bore 75 and terminates at the other port terminal. A second port (Port 2) is provided on the mechanically opposite side to the core 71, and comprises a second conductor 76 which runs from one port terminal, through the second bore, whereafter it exits and returns back through the first bore 74 and terminates at the other port terminal. The conductors 73, 76 therefore execute a single turn or winding, as with the previous embodiment, which is found to exhibit particularly advantageous results. Conductors 73 and 76 are twisted together within the core 71 as shown, but are insulated from one another by surrounding insulating material and have a substantially constant gap.

Effectively, each conductor 73, 76 is a U-shaped arrangement pulled from opposite ends through the core 71.

FIG. 16 shows the FIG. 15 arrangement in perspective view.

In one example, the Zc at Port 1 and Port 2 is 100 ohms, in which case the transmission line is arranged to be Zc/2=50 ohms.

Other example sizes with additional Common Mode Coupling (CMC) are given as follows.

To achieve 100 kHz at 37.5 mA/15000 μi for an OCL 350 μH, the dimensions would be Outer Diameter (OD) of 4 mm, Inner Diameter (ID) of 0.5 mm and length of 38 mm. For four lanes, this equates to a package size of 20 mm×45 mm×6 mm.

To achieve 100 kHz at 8 mA/15000 μi for an OCL 120 μH, the dimensions would be typically OD of 4 mm, ID of 0.5 mm and length of 12 mm. For four lanes, this equates to a potential package size of 20 mm×20 mm×6 mm.

FIG. 17 is an alternative construction 80, in which, effectively, the binocular core is divided into two parts 81*a*, 81*b*, but has the same general dimensions overall. In this case, the ports 1 and 2 are still mechanically opposed, but are between the two core parts 81*a*, 81*b*. More specifically, a first port (Port 1) is provided two one side of the core parts 81*a*, 81*b*, generally at the gap between the two, and comprises a first conductor 83 which runs from one port terminal, through the first bore 85*a*, whereafter it exits at one end and returns back through the second bore 84*a*, through to the other second bore 84*b*, exiting at the other end and returning back through the other first bore 85*b* and terminating at the other port terminal. The second port (Port 2) is provided on the opposite side of the core parts 81*a*, 81*b*, again generally at the gap between the two. A second conductor 86 runs from one port terminal, through the second bore 84*a*, whereafter it exits at one end and returns back through the first bore 85*a*, through to the other first bore 85*b*, exiting at the other end and returning back through the other second bore 84*b* and terminating at the other port terminal. Conductors 83, 86 and 76 are twisted together within the core parts 81*a*, 81*b*, as shown, but are insulated from one another by surrounding insulating material and may have a substantially constant gap.

Analysis by simulation of the FIG. 17 embodiment shows that it doubles the parasitic resonance than with the FIGS. 15 and 16 example. A 20 mm single bead construction has a 6 to 7 GHz resonance, whereas two 10 mm beads, as in FIG. 17, result in a resonance of 12-14 GHz. Either structures meet all the backward compatibility requirements of historic systems as well as evolving 40 GBase-T and 100 GBase-T standards, as would using the above toroidal or pot core construction. A pot core geometry is free of this resonance, and a bead geometry that accepts wire loops which is as wide as is long substantially suppresses this parasitic mode, being similar or equivalent to a square pot core.

In an embodiment of the FIGS. 15 to 17 examples, which is useful for understanding the invention, the pot core 71, 81 has a length of approximately 15 mm and the diameter of the central bores 74, 75, 84, 85 is approximately 0.2-0.5 mm. The permeability of the ferrite material is approximately 10,000μ. These embodiments exhibit under testing an open circuit inductance (OCL) of 160 μH and a bandwidth of 10 GHz and beyond. Variations of one or more of these parameters may provide higher bandwidths, depending on open circuit inductances.

The construction exhibits the aforementioned advantageous effects, making it particularly suited to wide bandwidth data transmission. For example, high bandwidth operation well beyond 2 GHz has been demonstrated, with insertion losses within the −3 dB standard. The use of only a single turn or winding for each conductor extends the upper frequency limit. Any worsening of the open circuit inductance (OCL) can be counteracted by, for example, dimensional changes to the core (e.g. the bore) and/or the permeability of the core material.

Preferred embodiments of the invention will now be described with particular focus on ITLTs and manufacturing methods for efficient production. These embodiments are based on the above topologies and characteristics, and this knowledge has been used to create transformers on a planar substrate which can take advantage of efficient manufacturing methods.

The embodiments involve depositing the ITLT conductors on a substantially planar substrate, such as PCB or flexi-PCB.

Any suitable insulative substrate can be used. In some of the embodiments that follow, it is assumed that a Flexi-PCB is used as the substrate on which conductors are deposited.

Figures 18A, 18B, 18C, 18D:
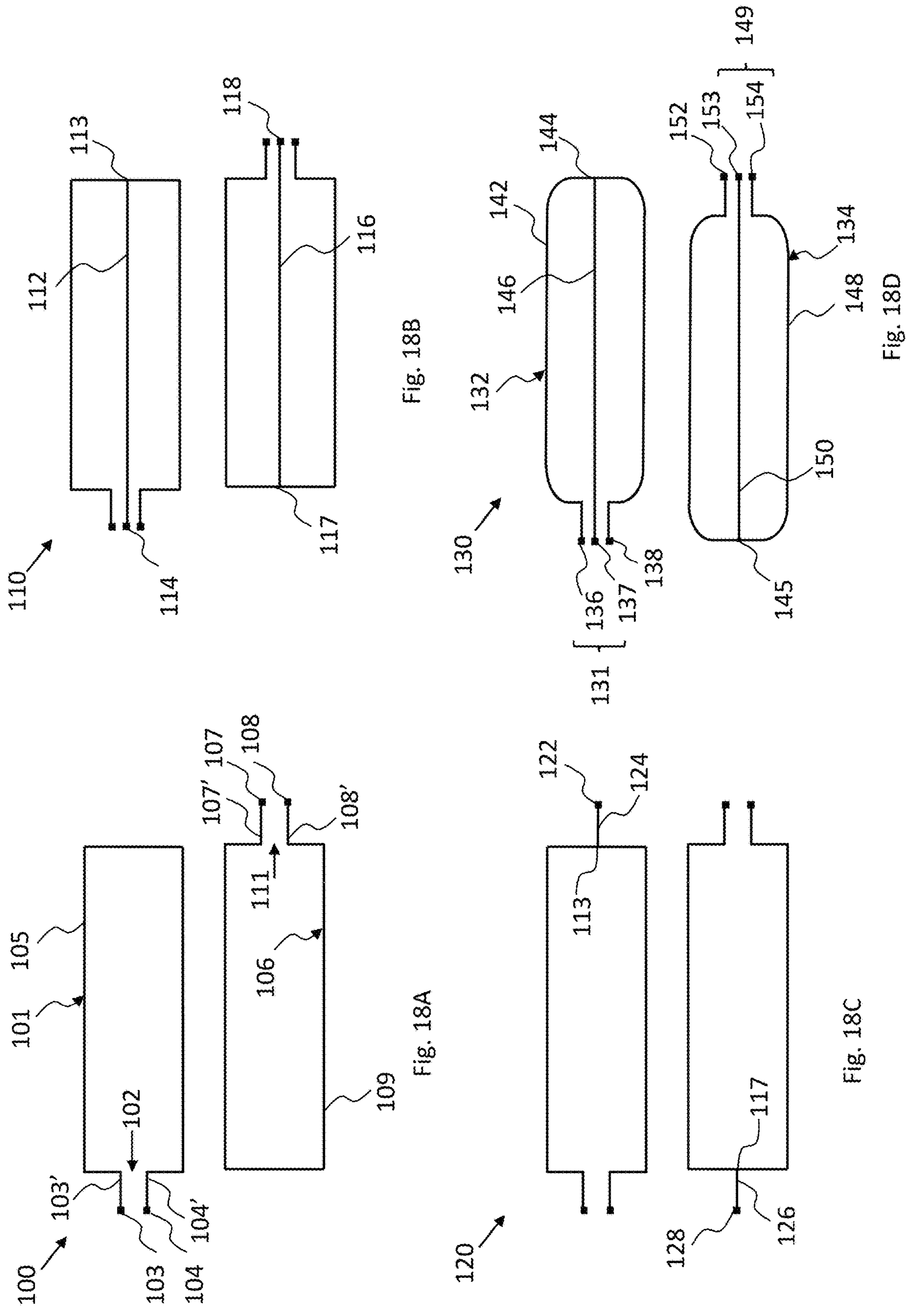
FIGS. 18A-18G are views of some transformer topologies used, but not limited to, the embodiments of the invention.
Figure 18E:
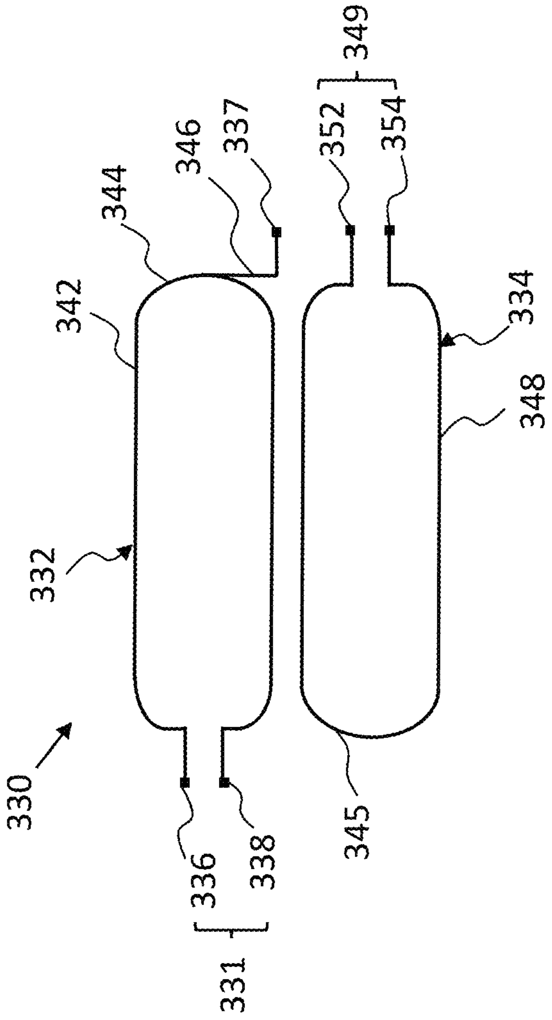
Figure 18F:
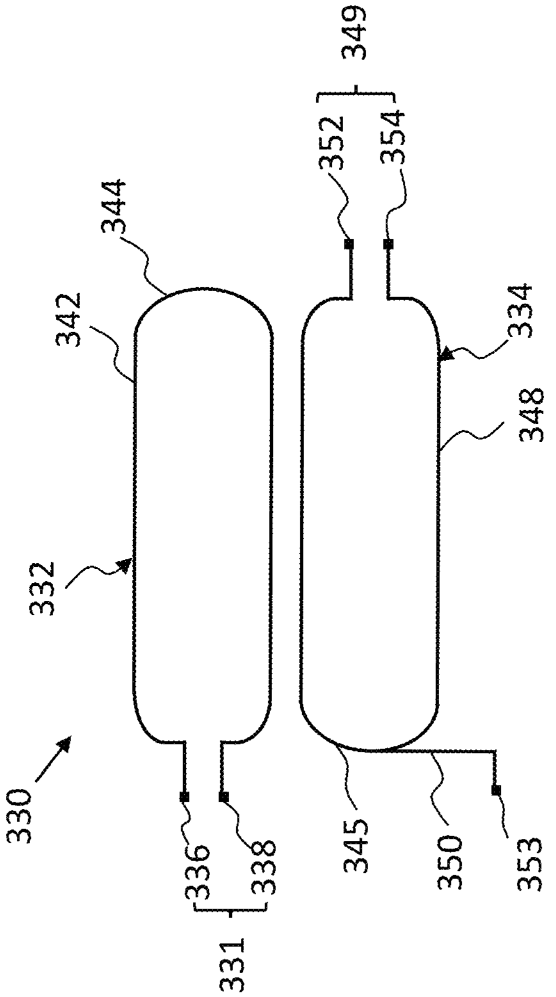
Figure 18G:
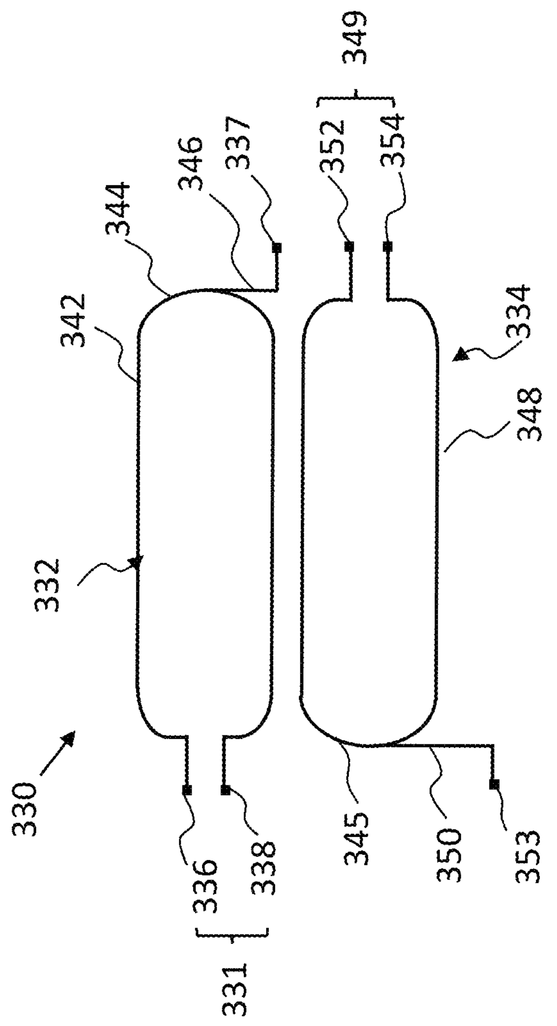

Referring to FIGS. 18A-18G, five distinct suitable ITLT topologies of the invention are shown, wherein in FIGS. 18E-18G variations of the fifth topology are shown.

FIG. 18A shows a first embodiment topology 100, which shows first and second track layouts 101, 106 which in use are deposited on opposite sides of the Flexi-PCB in opposite configurations as indicated. The track layouts 101, 106 are electrically isolated from each other, i.e. not connected by conductive tracks.

The first track layout 101 comprises a first port 102 formed by two, spatially separate port terminals 103, 104, which extend via conductors 103', 104' to a conductive loop 105. In this context (and in all such references below) the term loop means an incomplete loop which extends away from the port and returns back to the port in series connection.

The loop 105 is rectangular in plan view, and connected in series to respective terminals 103, 104 of the first port 102.

The second track layout 106 comprises a second port 111 formed by two, spatially separate port terminals 107, 108, which extend via conductors 107', 108' to a conductive loop 109. The loop 109 is connected in series to respective terminals 107, 108 of the second port.

The second loop 109 is formed having substantially the same shape and dimensions as the first loop 105, although it has the opposite orientation such that the first and second ports 102, 111 are opposite one another on the Flexi-PCB. The first and second loops 105, 109 overlie each other such that the lengthwise and widthways portions are in alignment either side of the Flexi-PCB, other than at the ports 102, 111.

FIG. 18B shows a second embodiment topology 110, which is similar to that of FIG. 18B, but in this case employs a centre-tap conductor. With regard to the first track layout 101, a first tap conductor 112 extends from the centre 113 of the widthways portion of the first loop 105. The first tap conductor 112 extends between, and parallel with, the lengthwise portions of the first loop 105 and terminates between the first port terminals 103, 104 at a third terminal 114. On the opposite side of the Flexi-PCB, the second track layout 106 employs a second tap conductor 116 which extends in a like manner from the centre 117 of the widthways portion of the second loop 109 and terminates between the second port terminals 107, 108 at a third terminal 118.

FIG. 18C shows a third embodiment topology 120, which is similar to that shown in FIG. 18B, but in this case respective first and second centre-tap conductors 124, 126 extend in the opposite directions to respective terminals 122, 128. This embodiment may have other variations of centre-tap implementations. For example it may comprise only the first centre-tap conductor 124, or in a further implementation it may comprise only the second centre-tap conductor 126.

FIG. 18D shows a fourth embodiment topology 130, which is similar to that shown in FIG. 18B, but uses curvilinear rather than orthogonal corner portions for the conductive loops. It comprises first and second track layouts 132, 134 on opposite sides of the flexi-PCB.

More particularly, the first track layout 132 comprises a first port 131 formed by two, spatially separate port terminals 136, 138, which extend via conductors to a first conductive loop 140 having curvilinear corners. Again, the term loop in this case means an incomplete loop. The first loop 140 is connected in series to respective terminals 136, 138 of the first port 131. A centre tap conductor 146 extends from the widthways centre point 144 and terminates at a third terminal 137 between the port terminals 136, 138.

The second track layout 134 comprises a second port 149 formed by two, spatially separate port terminals 152, 154, which extend via conductors to a second conductive loop 148. The second loop 48 is connected in series to respective terminals 152, 154 of the second port 149. A centre tap conductor 146 extends from the widthways centre point 145 and terminates at a third terminal 153 between the port terminals 152, 154.

As for the above embodiments, the second loop 148 is formed having substantially the same shape and dimensions as the first loop 140, although it has the opposite orientation such that the first and second ports 131, 149 are opposite one another on the Flexi-PCB. The first and second loops 140, 148 overlie each other such that the lengthwise and widthways portions are in alignment either side of the Flexi-PCB, other than at the ports 131, 149.

FIGS. 18E-18G show a fifth embodiment topology 330, which has similar centre-tap conductors as the one shown in FIG. 18C, but uses a radial geometry part for the conductive loops 344, 345. It comprises first and second track layouts 332, 334 on opposite sides of the flexi-PCB.

More particularly, the first track layout 332 comprises a first port 331 formed by two, spatially separate port terminals 336, 338, which extend via conductors to a first conductive loop 344 having a radial geometry. Again, the term loop in this case means an incomplete loop, e.g. half a circle or ellipse. The first loop 340 is connected in series to respective terminals 336, 338 of the first port 331. A centre tap conductor 346 extends from the widthways centre point of the first loop 344 and terminates at a third terminal 337 in the opposite direction of the port terminals 336, 338. The centre-tap conductor 346 may be a straight line or an angulated track.

The second track layout 334 comprises a second port 349 formed by two, spatially separate port terminals 352, 354, which extend via conductors to a second conductive loop 345. The second loop 345 is connected in series to respective terminals 352, 354 of the second port 349. A centre tap conductor 346 extends from the widthways centre point of the second loop 345 and terminates at a third terminal 353 in the opposite direction of the port terminals 352, 354.

As for the above embodiments, the second loop 345 is formed having substantially the same shape and dimensions as the first loop 334, although it has the opposite orientation such that the first and second ports 331, 349 are opposite one another on the Flexi-PCB. The first and second loops 343, 345 overlie each other such that the lengthwise and widthways portions are in alignment either side of the Flexi-PCB, other than at the ports 331, 349.

This embodiment may have other variations of centre-tap implementations. For example it may comprise only the first centre-tap conductor 324, or in a further implementation it may comprise only the second centre-tap conductor 326.

A method of constructing an ITLT using the FIGS. 18A-18G topologies will now be described. For convenience, the following will use the FIG. 18D topology but it will be appreciated that the FIGS. 18A-18G topologies can be implemented using similar steps.

Figure 19A:
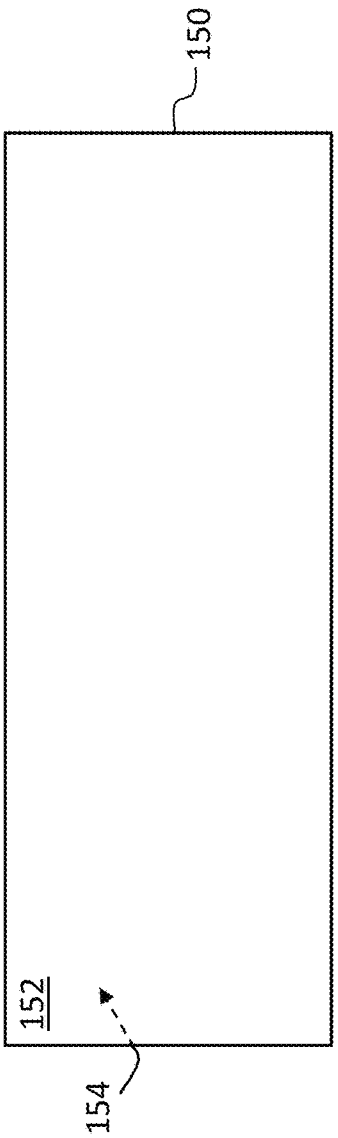
FIGS. 19A-19C are plan views of a substrate which carries one transformer topology.

In a first step, a planar substrate (hereafter "substrate") 150 is provided. Referring to FIG. 19A, the substrate 150 in this example is Flexi-PCB. The Flexi-PCB substrate 150 in some embodiments may be formed of polyimide with a thickness of approximately 50 microns. Other examples include PEEK or transparent conductive polyester film. As such, in various embodiments, the substrate may be of varying thickness, e.g. between 25 to 250 micron.

The substrate 150 has opposite first and second surfaces 152, 154 onto which the first and second track layouts 132, 134 are respectively deposited.

Figure 19B:
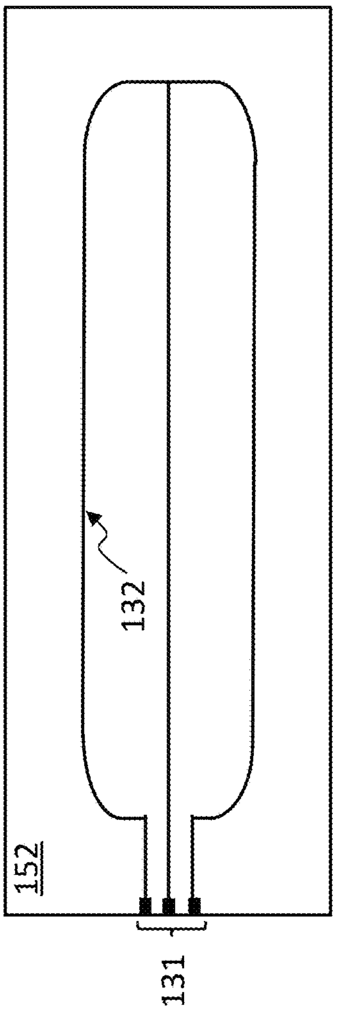

Referring to FIG. 19B, in a subsequent step, the first track layout 132 is deposited onto the first substrate surface 152. Known deposition techniques can be employed, including photolithography or similar methods.

Figure 19C:
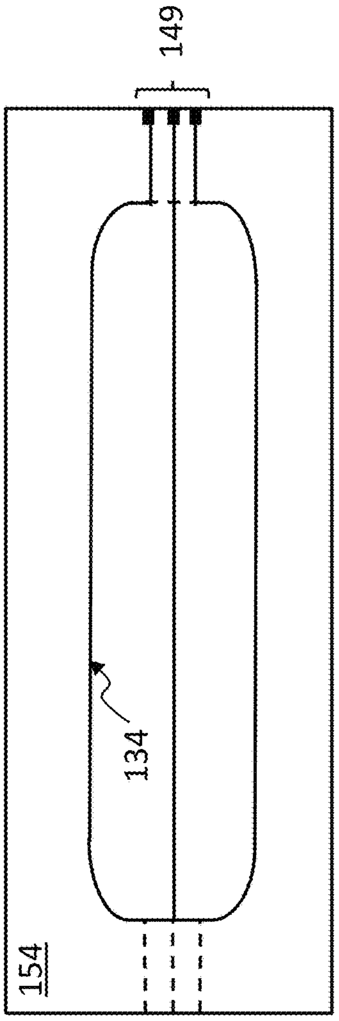

Referring to FIG. 19C, the second track layout 134 is then deposited onto the second substrate surface 154.

As will be seen in FIG. 19C, the first and second track layouts 132, 134 are in the opposite configurations shown in FIG. 18D.

Said track layouts 132, 134 substantially overlie one another, and in particular the conductive loops 140, 148 overlie one another except for the portions between the ports 131, 149. The dotted lines indicate areas of non-overlap on the reverse surface.

Figure 20:
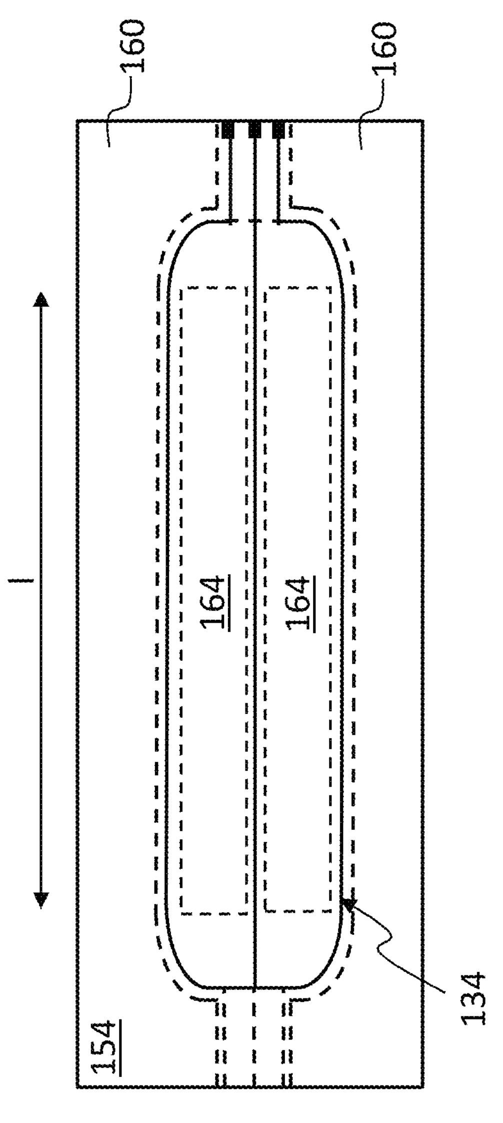
FIG. 20 is a plan view of the FIG. 19 substrate, with cut-out portions.

Referring to FIG. 20, one or more apertures are next formed in the substrate 150 to allow mounting of a core (not shown) in a manner to be described later on.

In this example, the lengthwise, outer edge portions 160 of the substrate 150 are removed by cutting (e.g. using mechanical or laser cutting) to leave a central portion 162 which carries the first and second track layouts 132, 134. Further, first and second apertures 164 are cut in-between the straight and parallel portions of the conductive loops 140, 148.

The apertures 164 have substantially the same dimensions, with the lengthwise dimension 1 not extending into the curvilinear corner portions.

Figure 21B:
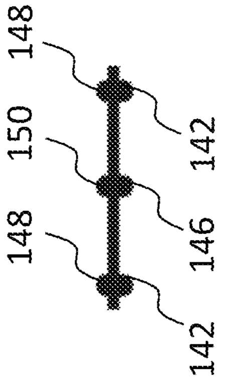
FIGS. 21A and 21B are perspective and end views of the substrate with cut-out portions removed.
Figure 21A:
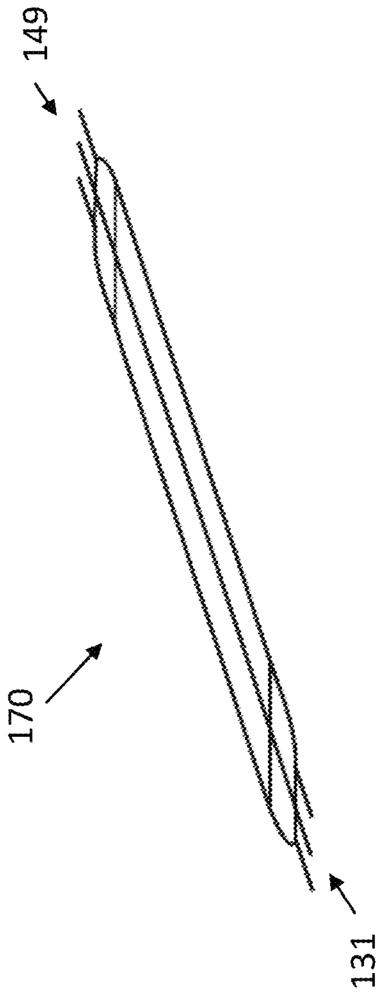

Referring to FIGS. 21A and 21B, the resulting "membrane" 170 which carries the first and second track layouts 132, 134 (including the ports and loops) is shown in perspective and cross-sectional views.

It will be appreciated that the same or similar steps can be applied to form membranes corresponding to the topologies shown in FIGS. 18A-18G. The resulting membrane 170 is lightweight and very thin in cross-section.

Figure 23A:
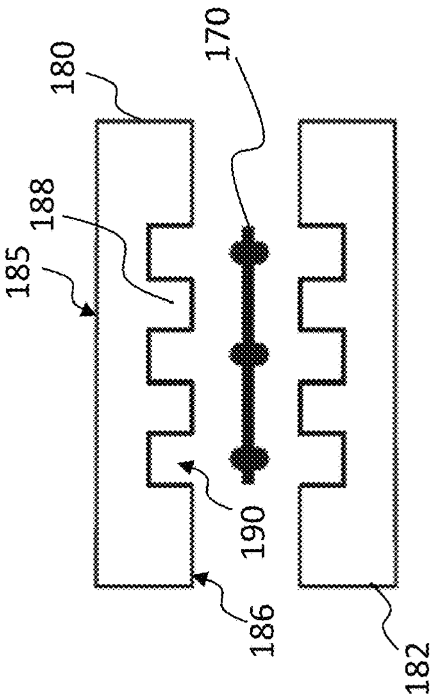
FIGS. 23A and 23B are end views of the FIG. 22 structure showing how the core is located over the substrate.
Figure 23B:
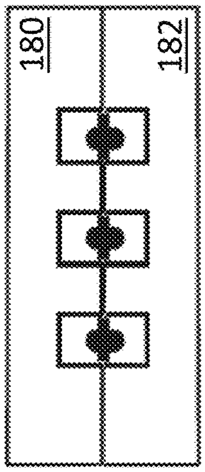
Figure 22:
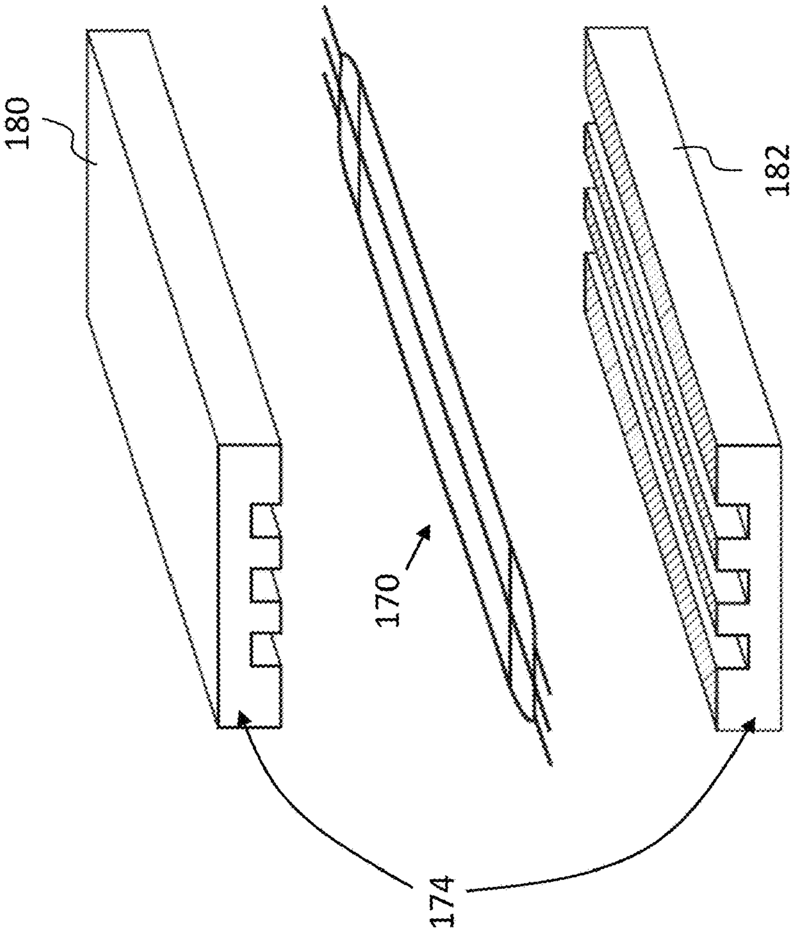
FIG. 22 is a perspective view of the FIG. 21 substrate in relation to a two-piece core.

Referring now to FIGS. 22, 23A, and 23B, a core 174 is connected to the membrane 170 to form the ITLT.

The core 174 may be formed of two substantially identical core sections 180, 182 which in use are placed either side of the membrane 170.

Each core section 180, 182 comprises a body 184 which may have a generally rectangular cross-section, the width of which is greater than that of the membrane 170. The length of the body 184 is substantially equal to that of the apertures 164 shown in FIG. 20. The body 184 may have a substantially planar top surface 185.

The opposite, bottom surface 186, may be substantially planar and includes a plurality of parallel lengthwise channels 190 defined between adjacent, downwardly-projecting walls 188. The cross-sectional profile may, in effect, be considered comb-like. Whilst rectangular-shaped channels 190 are used herein, in some embodiments other shaped channels can be used, e.g. arcuate.

The spacing between the channels 190 corresponds to the spacing between the parallel conductors on the membrane 170.

Further, the internal dimensions (in this case the width and height) of each channel are larger than the corresponding dimensions of the conductors so that the latter can locate within a channel without making contact with the core.

Referring now to FIGS. 23A and 23B, the core sections 180, 182 are placed either side of the membrane 170 so that the bottom surface of the walls 188 make contact.

In the shown embodiment, the two central walls 188 make contact through the membrane apertures 164. The outer walls 188' make contact either side of the membrane 170.

As shown in FIG. 23B, the two core sections 180, 183 connect in a symmetrical manner, either side of the membrane 170.

In other embodiments, the core sections may not be symmetrical, e.g. the walls of one section may be longer than those of the other.

It will also be seen that the membrane 170 is effectively sandwiched between the core sections 180, 183 with the two conductive loops 140, 148 supported within the channels 190 and spaced from the channel walls such that no contact is made.

The core sections 180, 183 can be fixed together using any known means, for example by adhesion or mechanical systems, such as clips.

The above-described steps provide a functioning ITLT which can be manufactured in large quantities using standard PCB type processes. Further preferred steps and structural features will now be described.

Figure 24:
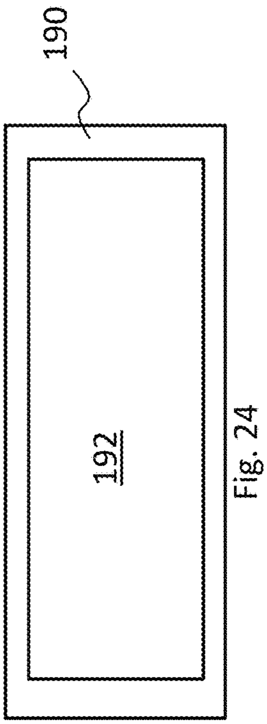
FIG. 24 is a plan view of a typical frame for mounting the substrate in accordance with some embodiments.

Referring to FIG. 24, a frame 190 is provided to enable straightforward placement and removal of the core sections 180, 182 in the correct position, either manually or by automatic means.

The frame 190 is formed of relatively rigid material such as insulative PCB material. A recess or aperture 192 is formed therein, in this case rectangular in shape. The dimensions of the aperture 192 correspond to those of at least the lower surface 186 of the core sections 180, 182.

Figure 25B:
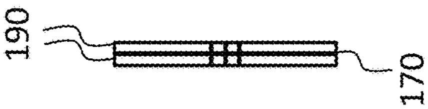
FIGS. 25A and 25B are plan and end views of the FIG. 24 frame with the substrate mounted.
Figure 25A:
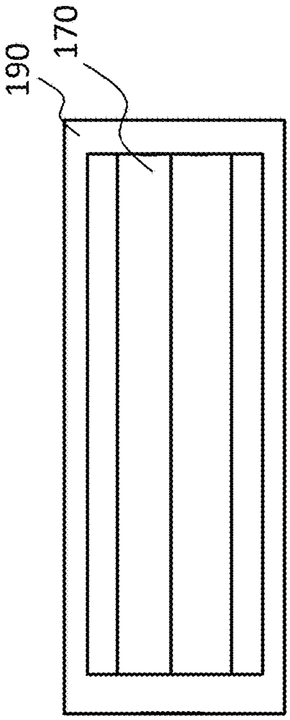

Referring to FIG. 25A, two such frames 190 are placed either side of the membrane 170 in opposed configuration; the frames 190 are bonded together to form a sandwich structure with the membrane being the central layer. The frame aperture 192 reveals only the parallel conductors on respective sides of the membrane 170 as shown, which are the parts that the core sections 180, 182 in use locate over.

FIG. 25B shows one widthways edge of the resulting ITLT structure, in which three parallel conductive tracks 194 are deposited; these connect respectively to the terminals of one port, e.g. terminals 152, 153, 154 of the second port 149 shown in FIG. 18A. These tracks 194 can be soldered to tracks of a mounting PCB 200, for which see FIG. 26A. This enables connection to a suitable component, for example a SMA connector for data communications. A like set of tracks (not shown) are provided on the opposite widthways edge for corresponding connection of the other port 131.

Figure 26B:
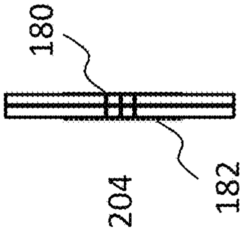
FIGS. 26A and 26B are plan and end views of the frame mounted on a printed circuit board.
Figure 26A:
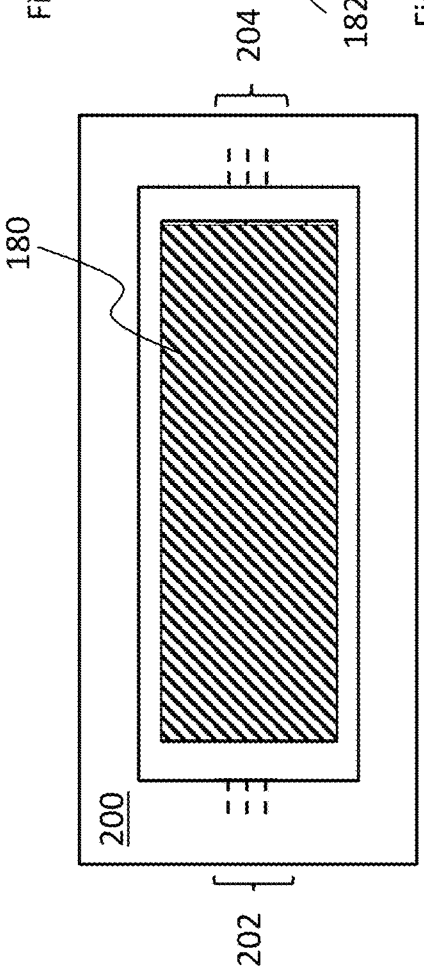

Referring to FIGS. 26A and 26B, one of the core sections 180 is shown when located within the frame aperture 192. In this way, no part, or only a small part of the core sections 180, 182 protrudes out of the frame 190. The frame 190 helps keep the core sections 180, 182 in position relative to the membrane 170.

In other embodiments, multiple such topologies, such as those shown in FIGS. 18A-18D can be deposited on a single piece of substrate.

Figure 27B:
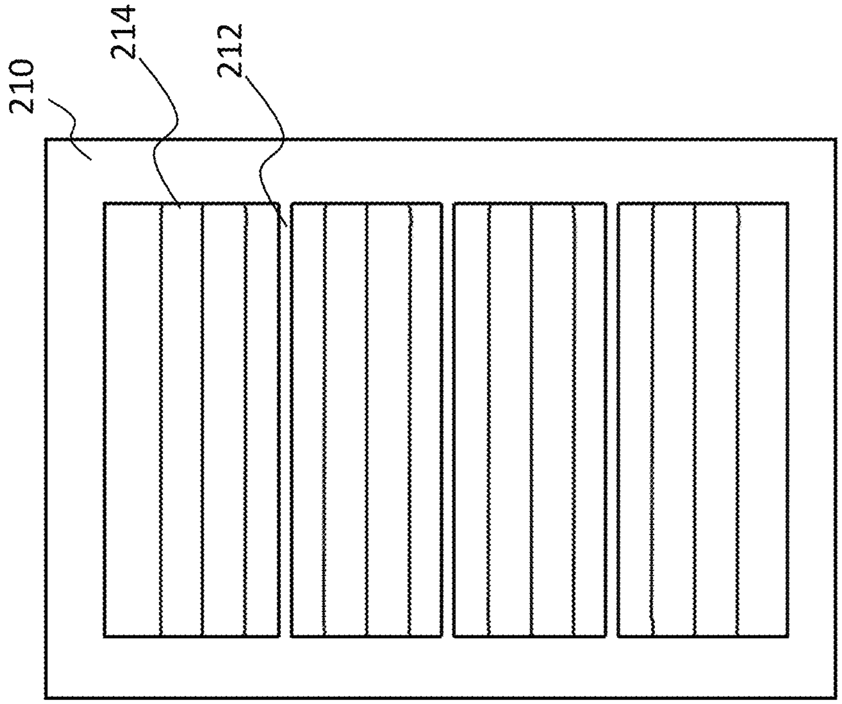
FIGS. 27A and 27B are top plan views of a further embodiment in which multiple transformers are provided on a single substrate.
Figure 27A:
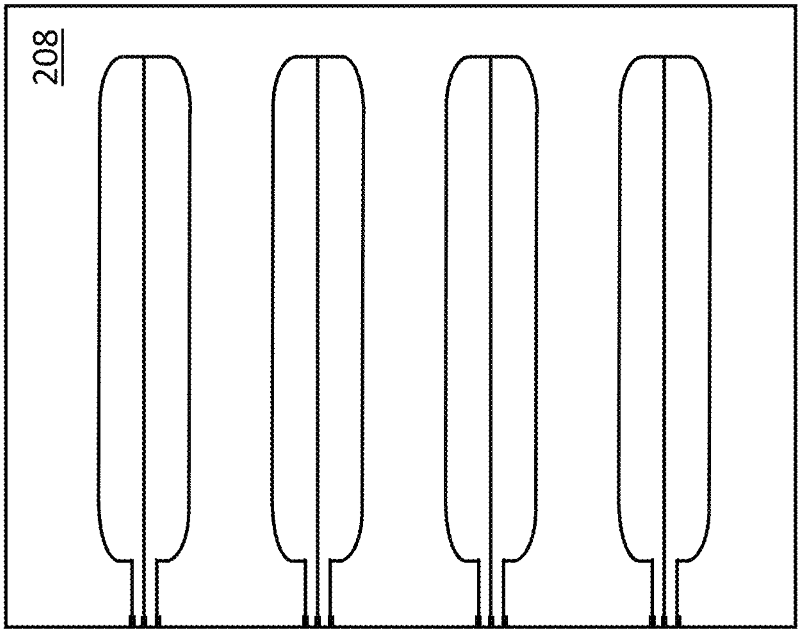

For example, and with reference to FIGS. 27A and 27B, four identical versions of the track layouts 132, 134 shown in FIG. 18D are provided, side-by-side in parallel, on respective sides of a single substrate 208.

A different frame structure 210 is provided with dividing walls 212 between apertures 214 which reveal the appropriate parts of the substrate below in a manner similar to that shown in FIG. 25. Placement of the core sections 180, 182 is performed on both sides. Eight such core sections 180, 182 will be required in this case.

Figure 28:
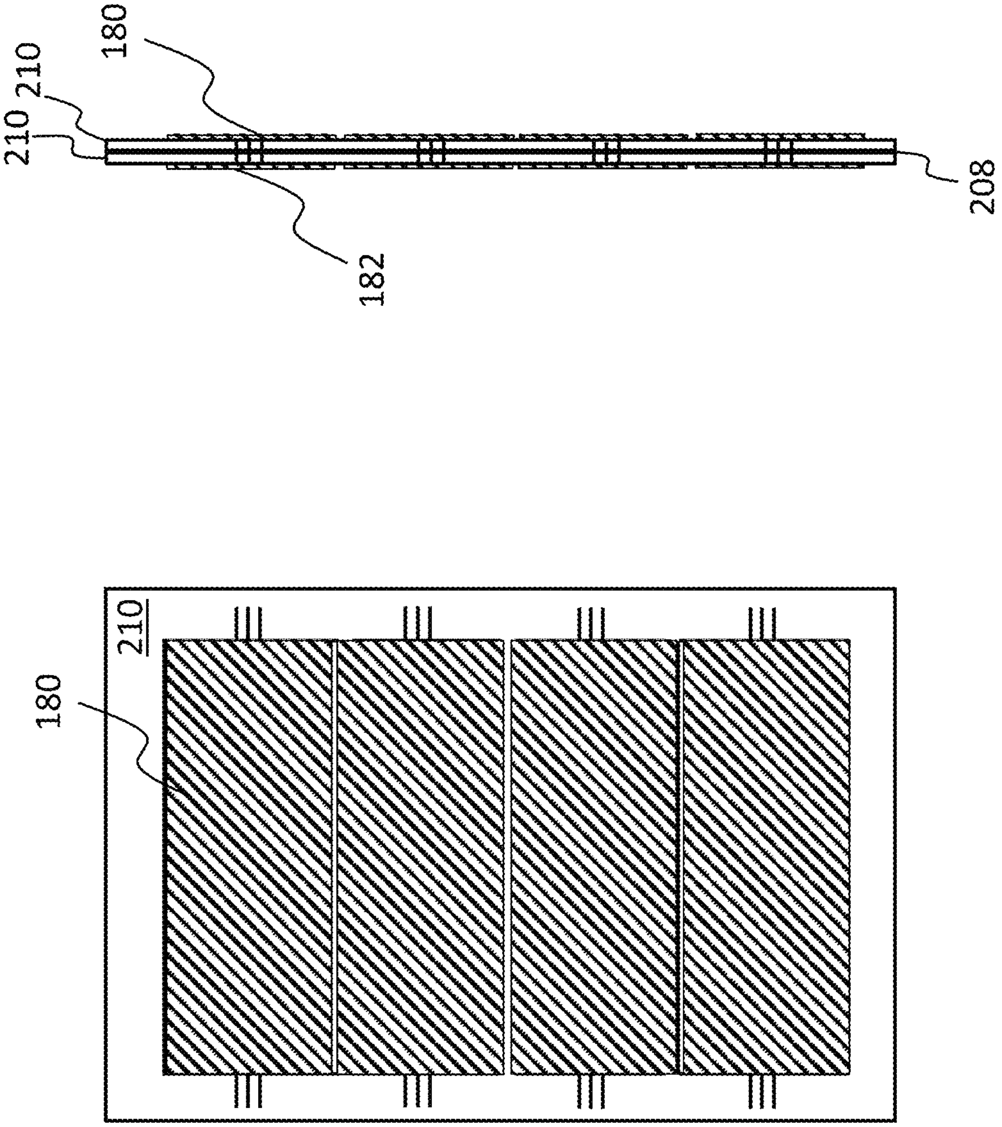
FIG. 28 is a plan and end view of the FIG. 27 embodiment mounted on a printed circuit board.

The resulting ITLT module 215 is shown in FIG. 28. The ITLT module 215 can be connected on one side to a mounting PCB and an enclosing cover placed over the upper side.

Alternatively, the four track layouts 132, 134 could be provided on separate substrates, held in place side-by-side under the apertures 214 by bonding the frame sections together.

The embodiment shown in FIGS. 27A, 27B, and 28 is convenient as in some applications, a multi-lane data communications system is employed.

In some embodiments, the following dimensions and other characteristics may be used when manufacturing the FIG. 18A-28 ITLT embodiments. Variation is possible.

To provide a transformer of 100 ohm characteristic impedance, the transmission lines are 50 ohms for the conductive loops and 100 ohms for the port or terminal connections.

The flexi-PCB may be polyimide sheet, which is available in 25, 50, 75 and 100 micron thicknesses.

The conductors may use copper cladding with any of 17.5, 35 and 70 micron thickness.

The core 74 is preferably a ferrite material, having a permeability in the region of 10,000.

In some embodiments, only part of the ITLT conductive loops are provided on the planar substrate. To illustrate this, by way of example, a further embodiment will now be described with reference to FIGS. 29 to 32.

Figure 29:
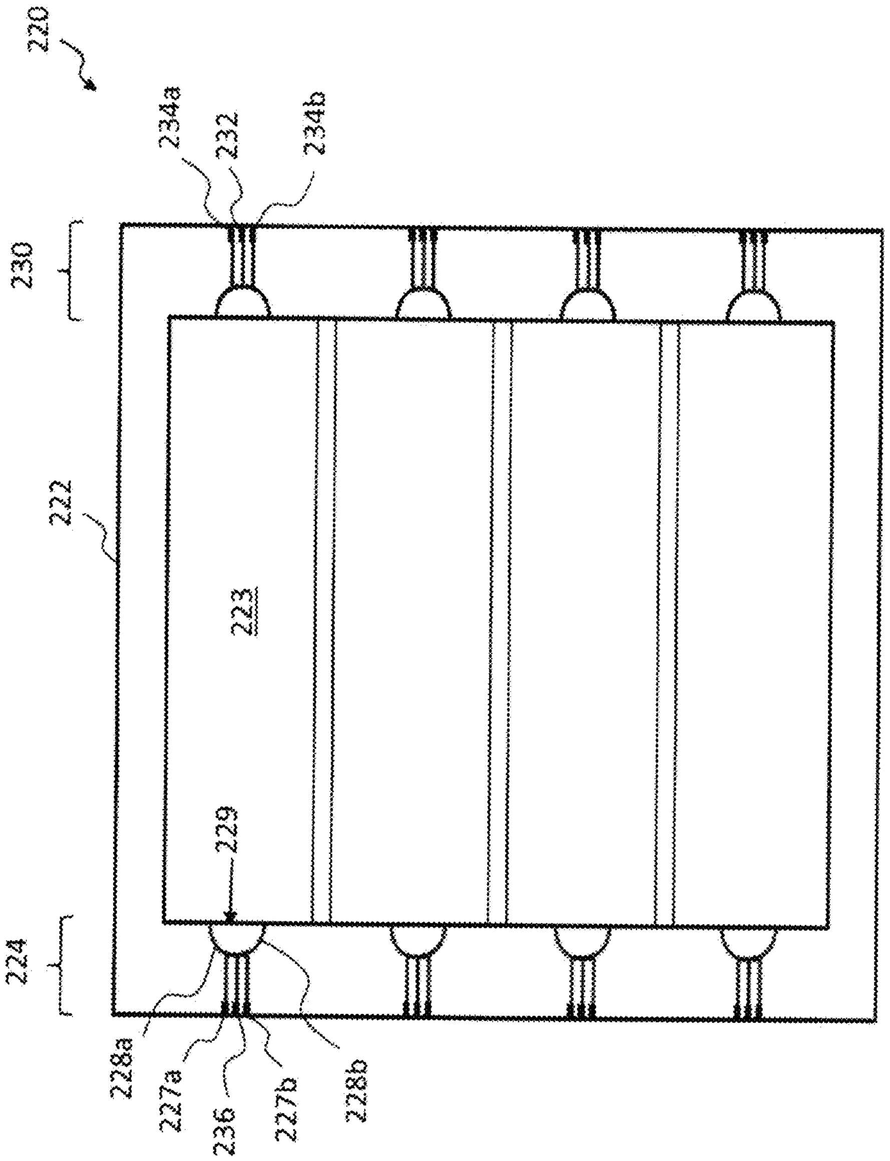
FIG. 29 is a plan view of a substrate carrying part of a transformer topology in accordance with a further embodiment.

Referring to FIG. 29, a substrate 220 is provided on which is deposited part of the ITLT topology shown in FIG. 18C and referred to briefly above. Any of the FIGS. 18A-18G topologies can be used in other embodiments.

Materials and dimensions for the substrate 220 may the same and similar to those given above. In this embodiment, four parallel ITLTs are to be provided on the substrate.

The substrate comprises an outer frame 222 with one or more cut-out portions 223 for each of the four ITLTs to be provided. Each cut-out 223 may be substantially rectangular. For ease of explanation, only the substrate layout for the upper ITLT is described.

At a first, left-hand side 224 of the frame 222 is deposited part of the FIG. 18C topology.

More specifically, a first port 227 is provided which comprises two spaced-apart terminals 227*a*, 227*b* with parallel tracks that extend inwards and then separate outwards along symmetrical curvilinear paths 228*a*, 228*b*. The two tracks 228*a*, 228*b* terminate at the perimeter 229 of the cut-out portion 223.

At the opposite, right-hand side 230 of the frame 222 is deposited the centre tap part of the FIG. 18C topology, including the portions having reference numerals 113, 122, 124 in the earlier Figure. A centre tap terminal 232 is shown in FIG. 29. In this case, the centre tap part is provided on the opposite surface of the substrate 220. In other embodiments, it may be on the same surface.

The second port 234 is provided on the right-hand side 226, including two terminals 234*a*, 234*b* and the tracks are deposited in a similar manner to those of the first port 227 described above, although in opposite orientation. The centre tap terminates at the terminal indicated by reference numeral 236.

The above-described substrate 220 can be constructed using known techniques.

Figure 30:
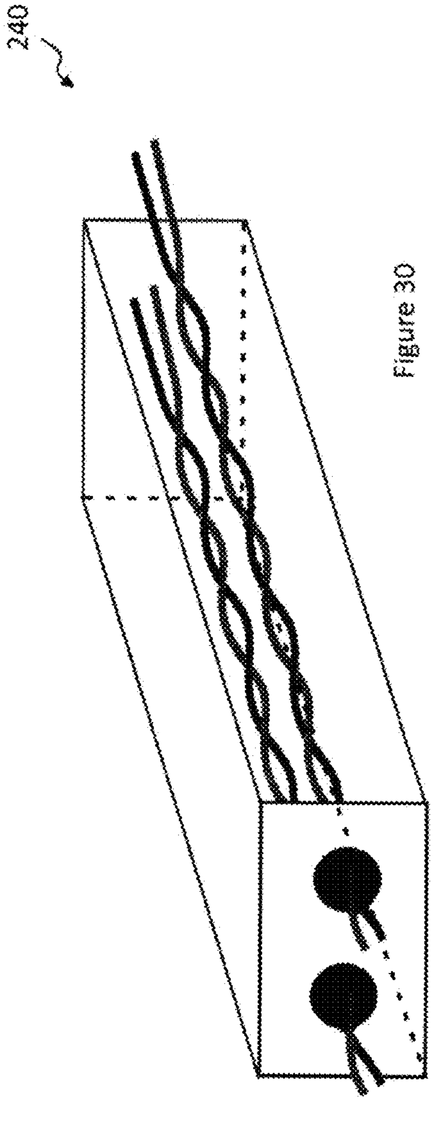
FIG. 30 is a perspective view of a core within which wires for completing the FIG. 29 topology are provided.
Figure 31:
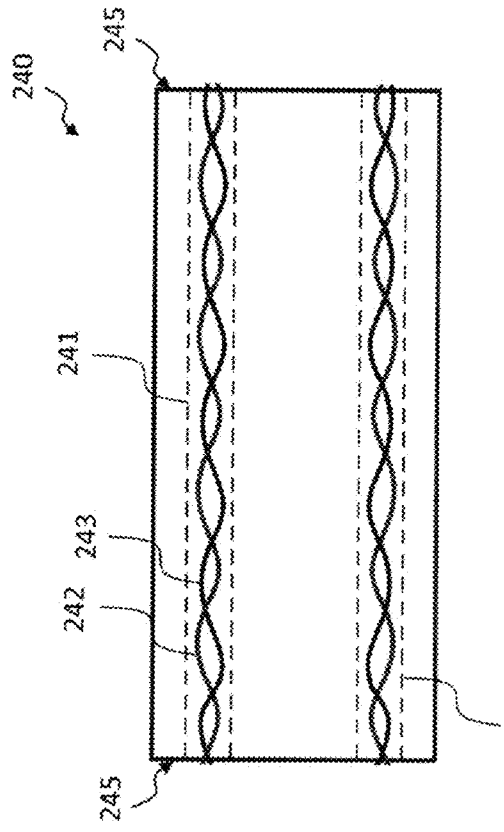
FIG. 31 is a plan view of the FIG. 30 core.
Figure 32:
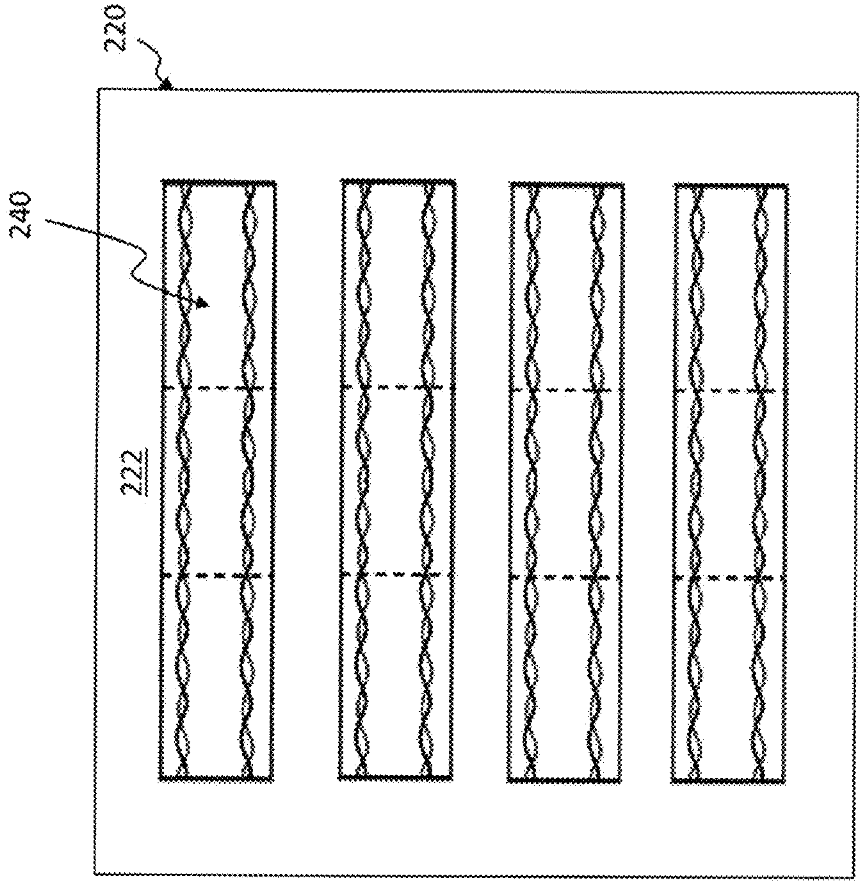
FIG. 32 is a plan view of the FIG. 29 substrate with the FIG. 30 cores mounted thereon.

Referring to FIGS. 30 to 32, each ITLT is completed by locating within each cut-out portion 223 a pre-constructed binocular-type core 240 having the same features described previously.

The core 240 has two parallel bores 241; within each bore is fed a pair of twisted conductors 242, 243, insulated from one another by an outer sheath. The ends of the conductors 242, 243 are exposed at the end faces 245 of the core 240.

This permits their electrical connection, e.g. by soldering, to each corresponding track deposited on the substrate 220 to complete the overall topology, e.g. that shown in FIG. 18C in this case.

Alternatively, in other embodiments wherein first and second conductors may be tracks on a PCB or a flexible PCB on, and extending, the substrate surface, or on a PCB or a flexible PCB on an additional spatially separate substrate surface.

Each core 240 is constructed and arranged to locate relatively tight within the cut-out portion 223, and this location can be performed using automated techniques. The electrical connection of the conductors 242, 243 to the substrate tracks, e.g. by soldering, may also be automated.

The process may be repeated for each of the other three ITLTs.

The core 240 can be provided in one-piece, or can be formed of multiple sections, e.g. two or more aligned sections. FIG. 32 indicates that each core 240 can be formed of three aligned sections.

In other embodiments, the core 240 or core sections can be formed of two oppositely-oriented sections, e.g. as shown in FIGS. 22, 23A, and 23B. In other embodiments, the core 240 can be replaced with a dielectric paste.

It will be appreciated that the above-described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An isolating transformer for use in data communications system, the isolating transformer comprising:
- a core;
- a plurality of ports including a first port and a second port mechanically and topologically opposite each other;
- a first conductor having a first coil,
  - connected in series to a first terminal and a second terminal of the first port, and wound around the core to provide the first coil;
- a second conductor having a second coil,
  - connected in series to a third terminal and a fourth terminal of the second port, and wound around the core to provide the second coil;
- wherein the first and second conductors are electrically isolated from one another;
- wherein the first and second coils have a plurality of windings;
- wherein the windings of the first and second coils are arranged around the core in such a way as to form a transmission line between them;
- wherein the second coil is wound in such manner that the second port includes outputs located within the second coil.

2. The isolating transformer of claim 1, wherein the first and second coils have a same number of the plurality of windings.

3. The isolating transformer of claim 1, wherein the outputs of the second port are located off-centre within the second coil.

4. The isolating transformer of claim 1, wherein the first and second conductors are wound around the core together as a pair.

5. The isolating transformer of claim 1, wherein the first coil has a first intermediary tap, connectable to a fifth terminal; and
- wherein the first intermediary tap, and fifth terminal, is mechanically close to, and typologically correspondent to, the third and fourth terminals of the second port.

6. The isolating transformer of claim 1, wherein the second coil has a first and second distal taps from the third terminal and fourth terminal, respectively,
- which first and second distal taps are respectively connectable to a sixth terminal and seventh terminal; and
- which sixth and seventh terminals are, respectively, mechanically close to, and typologically correspondent to, the first and second terminals of the first port.

7. The isolating transformer of claim 1, wherein the outputs of the second port are located at a centre location within the second coil.

8. The isolating transformer of claim 1, wherein the core is a ferrite core.

9. The isolating transformer of claim 1, wherein the core is toroidal.

10. The isolating transformer of claim 1, wherein the first and second conductors are spaced apart from each other for a first dimension.

11. The isolating transformer of claim 10, wherein the plurality of windings are spaced apart for a second dimension that is greater than the first dimension.

12. The isolating transformer of claim 1, wherein the first coil is an inner conductor.

13. The isolating transformer of claim 1, wherein the second coil is a tubular conducting shield.

14. The isolating transformer of claim 1, the first and second coils having an impedance value of 50 ohms.

15. A transformer system, comprising:

a plurality of isolating transformers connected to each other, each isolating transform of the plurality of isolating transformers including:

a core;

a first port having a first terminal and a second terminal;

a first conductor having a first coil, the first conductor connected in series to the first and second terminals, and wound around the core to provide the first coil;

a second port having a third terminal, a fourth terminal, and outputs, the first and second ports being mechanically and topologically opposite each other;

a second conductor having a second coil, the second conductor connected in series to the third terminal and the fourth terminal, and wound around the core to provide the second coil, the outputs being located within the second coil;

wherein the first and second conductors are electrically isolated from each another; and wherein the first and second coils have a plurality of windings arranged around the core in such a way as to form a transmission line between each other.

16. The transformer system of claim 15, wherein the plurality of isolating transformers are connected to each other in series, in parallel, or combination thereof.

* * * * *